US009073204B2

(12) United States Patent
Isobe et al.

(10) Patent No.: US 9,073,204 B2
(45) Date of Patent: Jul. 7, 2015

(54) LINK ACTUATION DEVICE

(75) Inventors: Hiroshi Isobe, Iwata (JP); Takayoshi Ozaki, Iwata (JP)

(73) Assignee: NTN CORPORATION, Osaka (JP)

( * ) Notice: Subject to any disclaimer, the term of this patent is extended or adjusted under 35 U.S.C. 154(b) by 361 days.

(21) Appl. No.: 13/698,446

(22) PCT Filed: May 11, 2011

(86) PCT No.: PCT/JP2011/060849
§ 371 (c)(1),
(2), (4) Date: Nov. 16, 2012

(87) PCT Pub. No.: WO2011/145499
PCT Pub. Date: Nov. 24, 2011

(65) Prior Publication Data
US 2013/0055843 A1 Mar. 7, 2013

(30) Foreign Application Priority Data
May 19, 2010 (JP) .................................. 2010-115095

(51) Int. Cl.
*B25J 17/00* (2006.01)
*B25J 17/02* (2006.01)
(Continued)

(52) U.S. Cl.
CPC .......... *B25J 9/0048* (2013.01); *Y10T 74/20323* (2015.01); *F16C 1/02* (2013.01); *F16D 1/04* (2013.01); *B25J 9/104* (2013.01)

(58) Field of Classification Search
CPC .......... B25J 9/104; B25J 18/06; B25J 9/1045; B25J 9/06; B25J 9/106; B25J 9/0078; B25J 9/0048; F16C 1/02; F16D 1/04

USPC ............... 74/490.01, 490.02, 490.04, 490.05; 901/15, 21, 27, 28

See application file for complete search history.

(56) References Cited

U.S. PATENT DOCUMENTS

RE13,884 E * 2/1915 Herzmark ....................... 74/502
3,266,059 A * 8/1966 Stelle .............................. 623/62
(Continued)

FOREIGN PATENT DOCUMENTS

JP          60-242991      12/1985
JP          2001-277164    10/2001
(Continued)

OTHER PUBLICATIONS

Machine Translation of JP2005-305585.*
(Continued)

*Primary Examiner* — Justin Krause

(57) ABSTRACT

An output member is connected with an input member through three sets of link mechanisms for alteration in attitude. The link mechanism includes end portion link mechanisms on an input side and an output side, respectively, and an intermediate link member. The link mechanism is such that a geometric model of each of the link members expressed by lines represents such a shape as an input side portion and an output side portion relative to a center of the intermediate link member are symmetrical with each other. By actuating two or more sets of the link mechanisms by means of a link mechanism drive source, the attitude of the output member is controlled. Through the inside of an arrangement of the link mechanisms, a flexible wire is provided for transmitting a rotational force in a direction of arrangement of the input and output members.

9 Claims, 23 Drawing Sheets

(51) Int. Cl.
  *B25J 18/00* (2006.01)
  *B25J 9/00* (2006.01)
  *F16C 1/02* (2006.01)
  *B25J 9/10* (2006.01)
  *F16D 1/04* (2006.01)

(56) References Cited

U.S. PATENT DOCUMENTS

| | | | | |
|---|---|---|---|---|
| 4,393,728 | A * | 7/1983 | Larson et al. | 74/469 |
| 4,466,429 | A * | 8/1984 | Loscher et al. | 606/180 |
| 6,014,909 | A * | 1/2000 | Fiora | 74/490.02 |
| 6,543,987 | B2 | 4/2003 | Ehrat | |
| 7,472,622 | B2 | 1/2009 | Isobe et al. | |
| 8,393,242 | B2 | 3/2013 | Ozaki et al. | |
| 2001/0019692 | A1 | 9/2001 | Ehrat | |
| 2004/0149064 | A1* | 8/2004 | Narita et al. | 74/490.03 |
| 2005/0159075 | A1 | 7/2005 | Isobe et al. | |
| 2006/0178672 | A1* | 8/2006 | Shores et al. | 606/79 |
| 2008/0257092 | A1 | 10/2008 | Nihei et al. | |
| 2011/0138962 | A1 | 6/2011 | Ozaki et al. | |
| 2012/0031219 | A1* | 2/2012 | Isobe et al. | 74/490.04 |
| 2012/0043100 | A1 | 2/2012 | Isobe et al. | |
| 2013/0184863 | A1* | 7/2013 | Isobe et al. | 700/245 |

FOREIGN PATENT DOCUMENTS

| | | |
|---|---|---|
| JP | 2003-148999 | 5/2003 |
| JP | 2003-231083 | 8/2003 |
| JP | 2004-223635 | 8/2004 |
| JP | 2005-144627 | 6/2005 |
| JP | 2005-305585 | 11/2005 |
| JP | 2008-264904 | 11/2008 |
| JP | 2010-63876 | 3/2010 |
| JP | 2010-69580 | 4/2010 |
| JP | 2010-260139 | 11/2010 |
| WO | WO 2010/018665 | 2/2010 |

OTHER PUBLICATIONS

Chinese Office Action issued May 30, 2014 in corresponding Chinese Patent Application No. 201180024354.4.

International Preliminary Report on Patentability issued Dec. 20, 2012 in corresponding ex-PCT Application No. PCT/JP2011/060849.

International Search Report of Corresponding PCT Application PCT/JP2011/060849 mailed Jul. 26, 2011.

Japanese Office Action mailed Jan. 14, 2014 in corresponding Japanese Application No. 2010-115095.

* cited by examiner

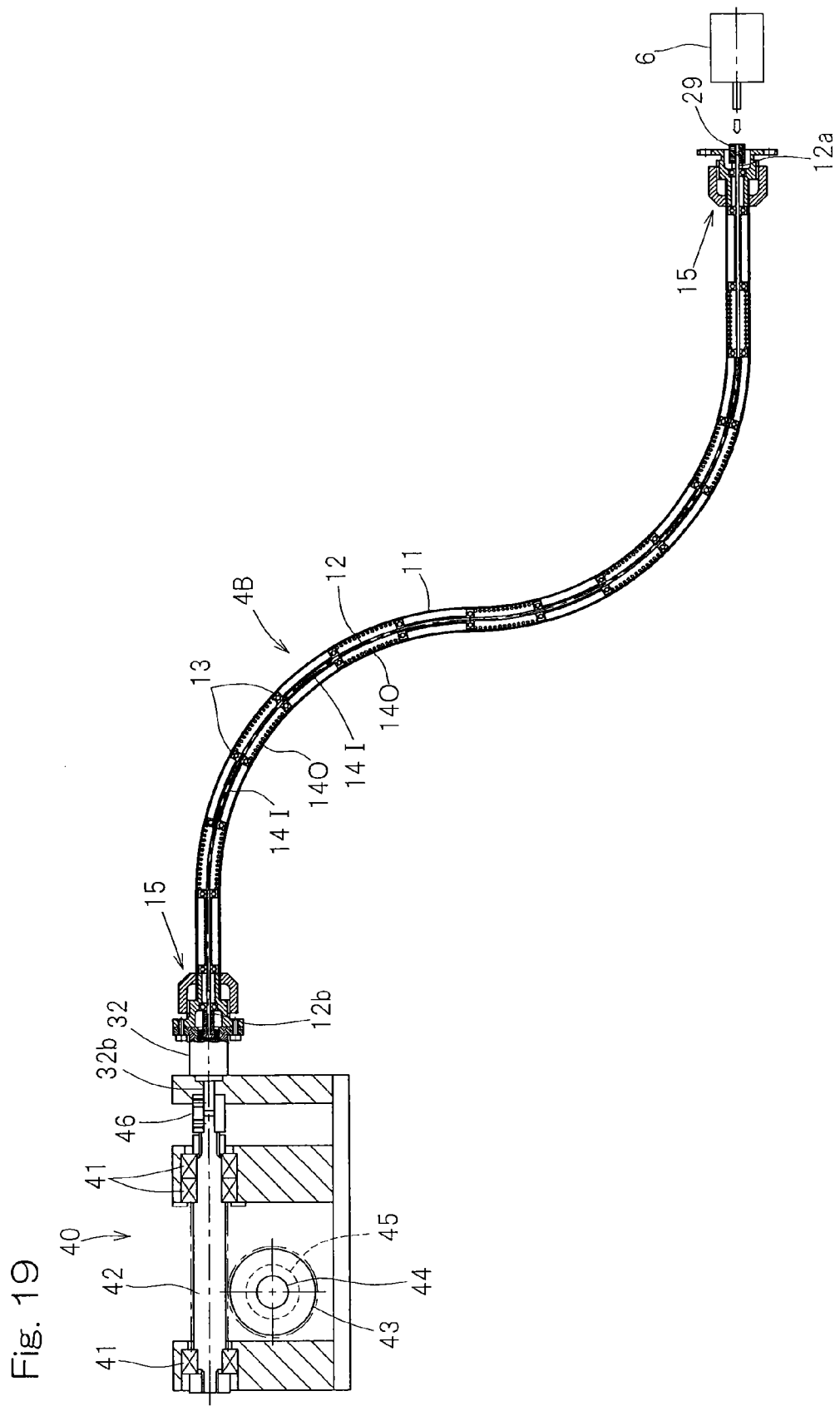

LINK ACTUATION DEVICE

CROSS REFERENCE TO THE RELATED APPLICATION

This application is a U.S. national stage application of PCT/JP2011/060849 filed May 11, 2011 and claims the foreign priority benefit of Japanese Application 2010-115095 filed May 19, 2010 in the Japanese Intellectual Property Office, the contents of both of which are incorporated herein by reference.

BACKGROUND OF THE INVENTION

1. Field of the Invention

The present invention relates to a link actuating device that may be used in a link mechanism such as, for example, a parallel link mechanism or a robot articulated joint which executes a work such as a complicated processing or article handling in a three dimensional space at high speed and with precision.

2. Description of Related Art

One example of processing machines utilizing a parallel link mechanism is disclosed in the patent document 1 listed below. The processing machine disclosed therein is of a type in which the movement and the change in posture of a movable part are effected by means of the parallel link mechanism, and the movable part thereof has mounted thereon a tool as an end effecter, an electric generator for generating an electric power used to actuate the tool, a servomotor for supplying a motive power to the electric generator and so on.

PRIOR ART LITERATURE

[Patent Document 1] JP Laid-open Patent Publication No. 2003-231083

If a drive source such as, for example, a servomotor is mounted on the movable part of the parallel link mechanism as disclosed in the patent document 1 listed above, the weight of the movable part increases and, hence, the inertia moment acting on the parallel link mechanism increases correspondingly. For this reason, the rigidity of the parallel link mechanism must be increased. Also, the drive source of the parallel link mechanism must be employed in the form of a large sized drive source. As a result thereof, the device in its entirety tends to become bulky. The larger the device is in size, the more difficult it is to handle the device and the more difficult it is to manipulate precisely. Accordingly, it is not suited for use in, for example, medical equipments.

SUMMARY OF THE INVENTION

In view of the foregoing, the present invention is intended to address to the provision of a link actuating device that is structured as a two-degree-of-freedom mechanism having a movable part movable in two axial directions perpendicular to each other, which movable part has a large range of movement, is lightweight and can be positioned accurately.

The link actuating device designed in accordance with the present invention a link actuating device for connecting an output member relative to an input member through three or more sets of link mechanisms for alteration in posture, which actuating device includes each of the link mechanisms comprising end portion link members on an input side and an output side each member having an one end thereof rotatably connected respectively with the input member and the output member, an intermediate link member to which the other ends of the respective end portion link members on the input side and the output side are rotatably connected, a geometrical model, in which each of the link members is expressed by a line, representing a shape that an input side portion and an output side portion of the intermediate link member relative to a center portion of the intermediate link member are symmetrical with each other. The link actuating device of the present invention also includes a link mechanism drive source provided in two or more sets of link mechanisms in the three or more sets of the link mechanisms for actuating each of the link mechanisms of the two or more sets to control the posture of the output member and a flexible wire passed inside an arrangement of the three or more sets of the link mechanisms and having a flexibility and operable to transmit a rotational force in a direction along a direction of arrangement of the input member and the output member. The output member referred to above is, for example, provided with a driven device adapted to be driven by a rotational force transmitted from the flexible wire. A drive mechanism of the driven device may be either a rotary mechanism or a direct acting mechanism.

Also, the link actuating device of the present invention can be rephrased as follows. That is, the link mechanism is employed in three or more sets, in which mechanism the end link members are rotatably connected with the input member and the output member, which are provided on the input side and the output side, and the end portion link members on the input side and the output side, respectively are rotatably connected with the intermediate link member; with respect to a transverse sectional plane at a center portion of each of the link mechanisms, the input side and the output side of the link mechanism are made geometrically symmetrical to each other; of revolve pairs of each of the link mechanisms connected with the input member, two or more sets of the link mechanisms are provided with link mechanism drive sources for controlling the posture of the output member arbitrarily; and the flexible wire having a flexibility and capable of transmitting the rotational force from the input side to the output side is provided having been passed inside each of the link mechanisms.

According to the above described construction, a two-degrees-of-freedom mechanism, in which a movable section comprised of the output member and others is movable in two axis directions perpendicular to each other, is constituted by the three or more sets of the link mechanisms and the link mechanism drive source provided in two or more sets of the link mechanisms. This two-degrees-of-freedom mechanism is such that the large range of movement of the movable section can be obtained. By way of example, the maximum working angle between the center axis of the input member and the center axis of the output member can take about ±90° and the angle of turn of the output member relative to the input member can be set to a value within the range of 0 to 360°. Since, of the revolve pairs of each of the link mechanisms that are connected with the input member, two or more sets of the link mechanism are provided with a link mechanism drive source for controlling the posture of the output member arbitrarily, the output member can be easily set to an arbitrary posture. The reason that the revolve pair of the link mechanisms which are provided with the link mechanism drive sources, respectively, is chosen in two or more sets is because it is essential for the pasture of the output member relative to the input member to be fixed.

If the flexible wire having a flexibility is provided through the inside of each of the link mechanisms and the rotational force is transmitted from the input side to the output side through this flexible wire, the driven device provided in the movable section can be driven with no need to provide the drive source in the movable section. For this reason, the weight of the movable section can be reduced. As a result, the inertia moment acting on the link actuating device is reduced and compactization of the drive source for driving the link actuating device can be easily achieved. Also, if the movable section is lightweight, handing is easy and the positioning accuracy of the movable section is increased. In addition, where the driven device is provided in the movable section, this driven device and the drive source for the driven device can be installed at respective places distant from each other and, therefore, it is easy to keep the driven device in a clean condition.

Since the flexible wire has a flexibility, it is possible to assuredly transmit the rotational force from the input side to the output side even though the posture of each of the link mechanisms is changed to control the position of the movable section. In case the end portion link members on the input side and the output side of each of the link mechanisms are made of spherical surface link mechanisms, respective spherical surface link centers of each of the link mechanisms coincide with each other, and the distances from those centers to associated end portion link members remain the same. Accordingly, even though the posture of each of the link mechanisms changes, the distances between the spherical surface link centers on the input side and the output side do not change and, therefore, no excessive axial force (tensile force) does not act on the flexible wire and the rotational force can be assuredly transmitted.

In the present invention, a throughhole is preferably provided in each of the input member and the output member, in which case the flexible wire is passed through those throughholes in the input and output members. If the flexible wire is passed through respective throughholes in the input member and the output member, the flexible wire extends inside of each of the link mechanisms at all times even though each of those link mechanisms assumes any posture. Accordingly, an undesirable contact of the flexible wire with an extra member is prevented.

In the present invention, the flexible wire is preferably guided by a wire guide member fixed to the intermediate link member and positioned inside each of the link mechanisms. Regardless of the posture each of the link mechanisms, the intermediate link members in at least two link mechanisms out of the three or more link mechanisms pass along a single circular trajectory. For this reason, if the flexible wire is guided by the wire guide member positioned inside each of the link mechanisms and fixed to the intermediate link members, interference between the flexible wire and an external member such as, for example, the intermediate link member and/or the end link members can be avoided.

The wire guide member referred to above may have a center thereof provided at a position coinciding with a center of the circular trajectory of the intermediate link member. Since the center of the circular trajectory of the intermediate link member always lies on a straight line connecting between respective spherical surface link centers on the input side and the output side and the distance between the spherical link centers is constant even when the posture of each of the link members changes, positioning of the wire guide member in the manner described above makes it possible to arrange the flexible wire with the smallest distance at a position where no change in distance occurs.

In the present invention, the flexible wire is recommended to have a flexible outer tube, a flexible inner wire having its opposite ends defining an input end and an output end for respective rotations and rotatably supported within the outer tube by means of a plurality of rolling bearings, and a spring elements provided between the neighboring rolling bearings for applying a preload to the rolling bearing. If the inner wire, which forms a rotary shaft of the flexible wire, is provided inside the outer tube, the inner wire can be protected. The use of the spring elements for rotatably supporting the inner wire through a plurality of rolling bearings and positioned between the neighboring rolling bearings is effective to prevent the natural frequency of the inner wire from being lowered, allowing the inner wire to be rotated at a high speed.

The spring element referred to above includes preferably an inner ring spring element for applying the preload to an inner ring of the rolling bearing and an outer ring spring element for applying the preload to an outer ring, in which case the inner ring spring element and the outer ring spring element are to be alternately arranged in a direction lengthwise of the inner wire. Positioning the inner ring spring element and the outer ring spring element alternately in the direction lengthwise of the inner wire permits the spring elements to be provided without the diameter of the outer tube being unduly increased.

A rotary drive source for rotating the inner wire may be provided on an input end side of the flexible wire and connected with the input end of the inner wire. The provision of the rotary drive source is effective to efficiently apply a torque to the inner wire.

A reduction gear for reducing the rotation of the inner wire may be provided on an output end side of the flexible wire and connected with the output end of the inner wire. The provision of the reduction gear on an output end side of the flexible wire is effective to allow a high torque to be generated even though the torque to be transmitted by the inner wire is low. For this reason, when the driven device having a rotary mechanism is installed on the output side of the reduction gear, a large rotation torque can be obtained, and meanwhile, when the driven device having a direct acting mechanism is provided on the output side of the reduction gear, a large thrust force can be obtained. Since against the friction occurring in the rotary mechanism and/or the direct acting mechanism a force necessary to overcome such friction can be generated, stick slip phenomenon will hardly occur even though the torsional rigidity of the inner wire is low. Also, the provision of the reduction gear makes it possible to use a thin inner wire and, with a compactized structure, the flexible wire having a further high flexibility can be realized. In addition, as the rotation drive source to be installed on the input side of the flexible wire, a compact and an inexpensive motor can be employed.

In addition, where the operating position of the drive mechanism for the rotary mechanism or the direct acting mechanism for the driven device is controlled by a feedback scheme, the following functions and effects can be obtained. Specifically, since the speed of the driving force is reduced by the reduction gear before the driving force is transmitted to the output side, influences brought about by twisting of the inner wire, which appear on an output shaft of the reduction gear, are minimized and the positioning resolution of the operating position of the drive mechanism is high, thereby to achieve a high level feedback control.

Since the link actuating device of the present invention has the functions and the effects both described above, it is suitable for use in medical equipments.

By designing a remote controlled robot of a kind, in which an actuating device that can be driven by the rotational force transmitted from the flexible wire is provided in the output member of the link mechanism, this driven device can be operated by remote control.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 19 is a longitudinal sectional view showing the flexible wire, a drive device connected with one end of the wire, and a rotary drive source connected with the other end of the wire;

DESCRIPTION OF PREFERRED EMBODIMENTS

Figure 1:
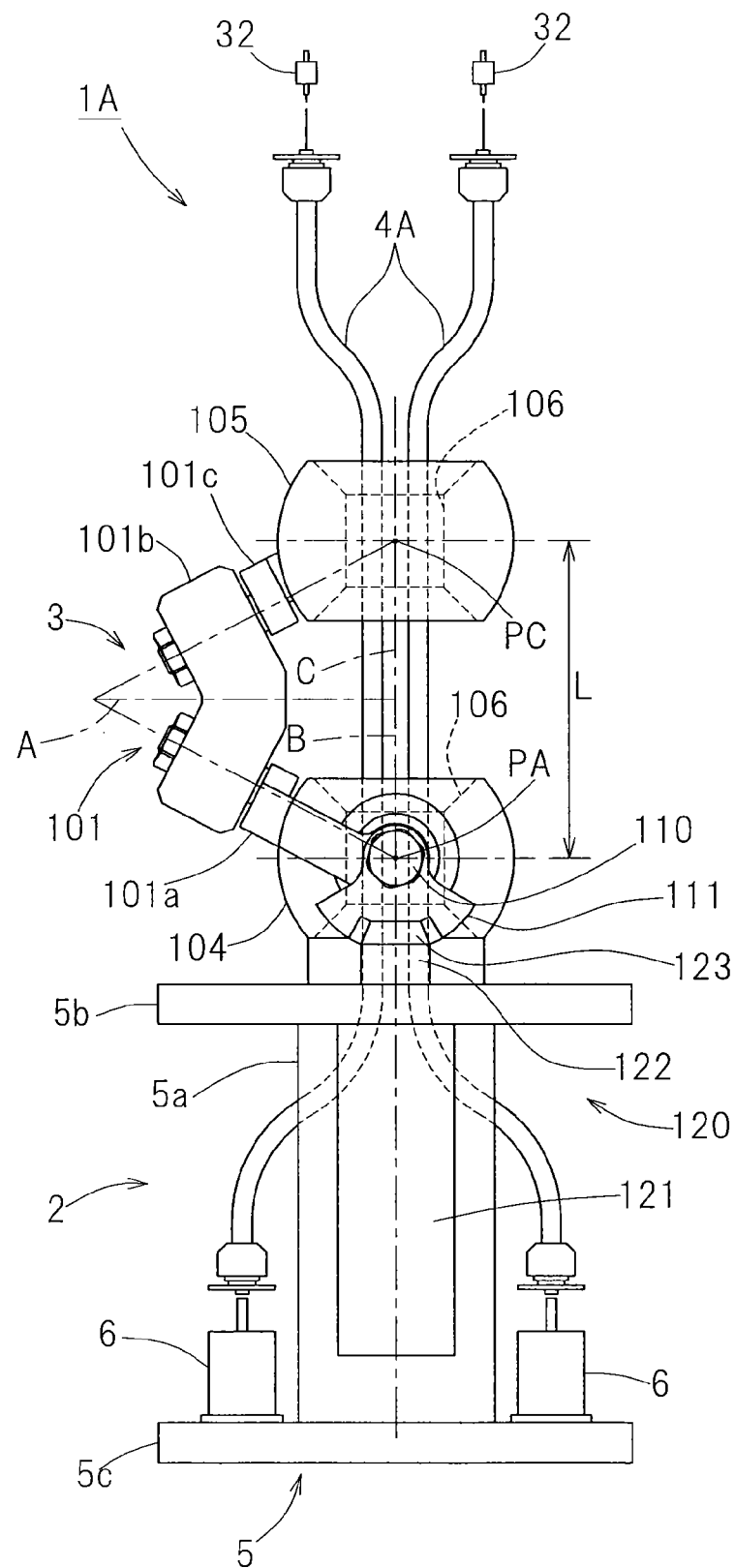
FIG. 1 is a front elevational view showing, with a portion cut out, a link actuating devised according to a first preferred embodiment of the present invention.
Figure 2:
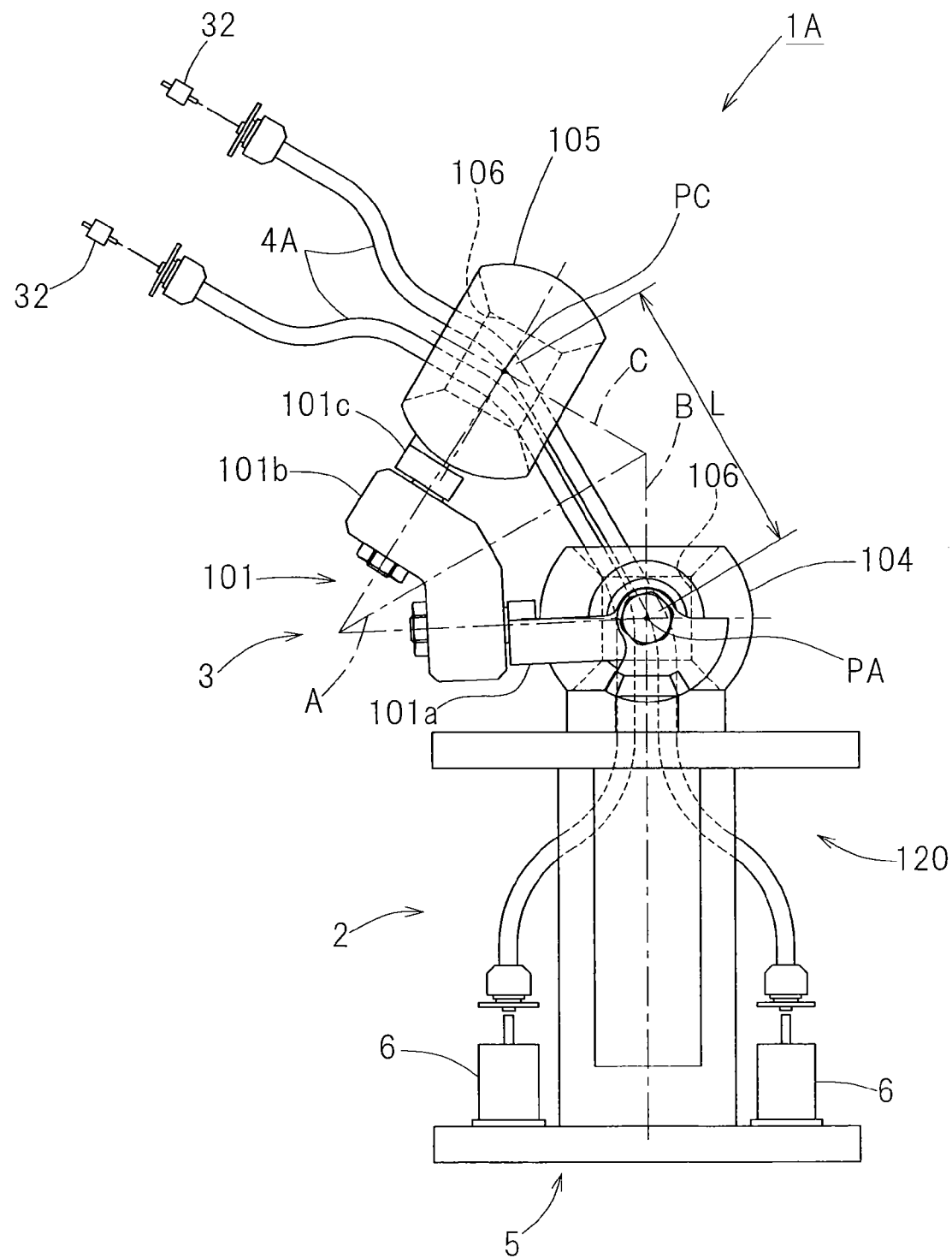
FIG. 2 is a front elevational view showing, with a portion cut out, the link actuating mechanism of FIG. 1 in an operative condition different from that shown in FIG. 1.

A first preferred embodiment of the present invention will be described in detail with particular reference to FIG. 1 to FIGS. 5A to 5C. As shown in FIGS. 1 and 2, a link actuating device, generally identified by 1A, includes a drive section 2 forming a base of the device, a link mechanism section 3 having an input side supported by the drive section 2, and a flexible wire 4A provided through inside of the link mechanism section 3 for transmitting a rotational force therethrough. The link mechanism section 3 also has an output side on which a driven device (not shown) such as, for example, a processing equipment is mounted, and this drive mechanism becomes a movable portion movable relative to the drive section 2. In the illustrated embodiment, the flexible wire 4A is employed in two in number, but the number of the flexible wire 4A may not necessarily be limited to that shown provided that one or more flexible wires are employed. It is to be noted that in FIGS. 1 and 2, different operative positions of the same link actuating device 1A are shown, respectively.

The drive section 2 includes a base unit 5 made up of a base unit main body 5a and upper and lower flange portions 5b and 5c provided respectively at upper end lower ends of the base unit main body 5a. The upper flange portion 5b is provided with link mechanism drive sources 121, as will detailed later, in a suspended fashion and the lower flange portion 5c is provided with rotary drive sources 6 in an orthostatic fashion, which generate a rotational force that the flexible wire 4A transmits.

Figure 3:
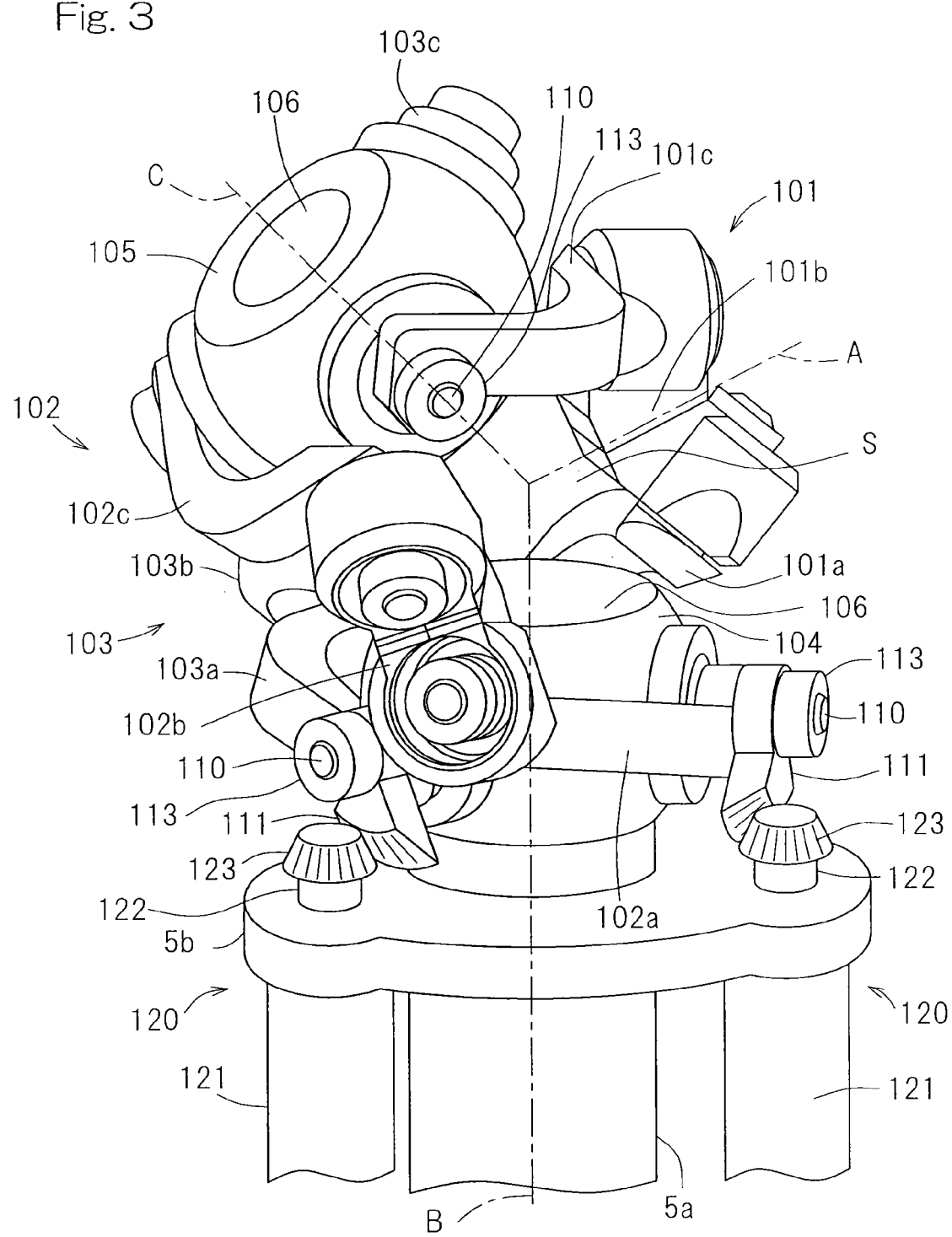
FIG. 3 is a perspective view showing the link actuating mechanism of FIG. 1.

As shown in FIG. 3, the link mechanism section 3 includes three sets of link mechanisms 101, 102 and 103 (hereinafter designated by 101 to 103). It is to be noted that in FIGS. 1 and 2, only one set of the link mechanism 101 is illustrated. The three sets of those link mechanisms 101 to 103 have respective shapes that are geometrically identical with each other. In other words, each of the link mechanisms 101 to 103 is of such a shape that geometric models of each of link members 101a to 103a, 101b to 103b and 101c to 103c, when schematically expressed by lines, is such that an input side portion and an output side portion relative to an intermediate portion of the intermediate link members 101b to 103b are symmetrical to each other. The input sides of the link mechanisms 101 to 103 are mounted on the upper flange portion 5b of the base unit 5.

Each of the link mechanisms 101, 102 and 103 is made up of an end portion link member 101a, 102a and 103a (hereinafter designated as 101a to 103a) on the input side, an intermediate link member 101b, 102b and 103b (hereinafter designated as 101b to 103b) and an end portion link member 101c, 102c and 103c (hereinafter designated as 101c to 101c) on an output side, and forms a three-link chain mechanism comprised of four revolve pairs. Each of the end portion link members 101a to 103a, 101b to 103b on the input side and the end portion link members 101c to 103c on the output side is of a spherical surface link structure. The former three link members 101a to 103a have a common spherical surface link center PA and the latter three link members 101c to 103c have a common spherical surface link center PC. In each of the three link mechanism 101 to 103, distances from the associated center PA or PC to the respective three end portion link members 101a to 103a or 101c to 103c are the same. The axes of the revolute pairs, which define joints between the end portion link member 101a to 103a or 101c to 103c and the intermediate link member 101b to 103b may have a certain crossed axes angle or may be parallel to each other. It is, however, to be noted that the respective shapes of the intermediate link members 101b to 103b in the three sets of the link mechanisms 101 to 103 are geometrically identical with each other.

One set of the link mechanism 101 to 103 includes an input member 104 arranged on the input side and mounted on the upper flange portion 5b of the base unit 5, an output member 105 disposed on the output side, the two end portion link members 101a to 103a and 101c to 103c rotatably connected with the input member 104 and the output member 105, respectively, and the intermediate link member 101b to 103b connected rotatably with the respective end portion link members 101a to 103a and 101c to 103c and connecting the two end portion link members 101a to 103a and 101c to 103c together.

The link mechanism 101 to 103 employed in this preferred embodiment is of a rotation symmetrical type and the positional relation between an input side group of the input member 104 and the end portion link member 101a to 103a and an output side group of the output member 105 and the end portion link member 101c to 103c is such as to form a positional construction in which the positional relation is rotationally symmetrical with respect to a center line A of the intermediate link member 101b to 103b. FIG. 1 illustrates a condition in which a center axis B of the input member 104 and a center axis C of the output member 105 lie on the same line and FIG. 2 illustrates a condition in which the center axis C of the output member 105 relative to the center axis B of the input member 104 assumes a predetermined working angle. Even when each of the link mechanisms 101 to 103 changes in its posture, the distance L between the spherical surface link centers PA and PC on the input side and the output side does not change.

Figure 4:
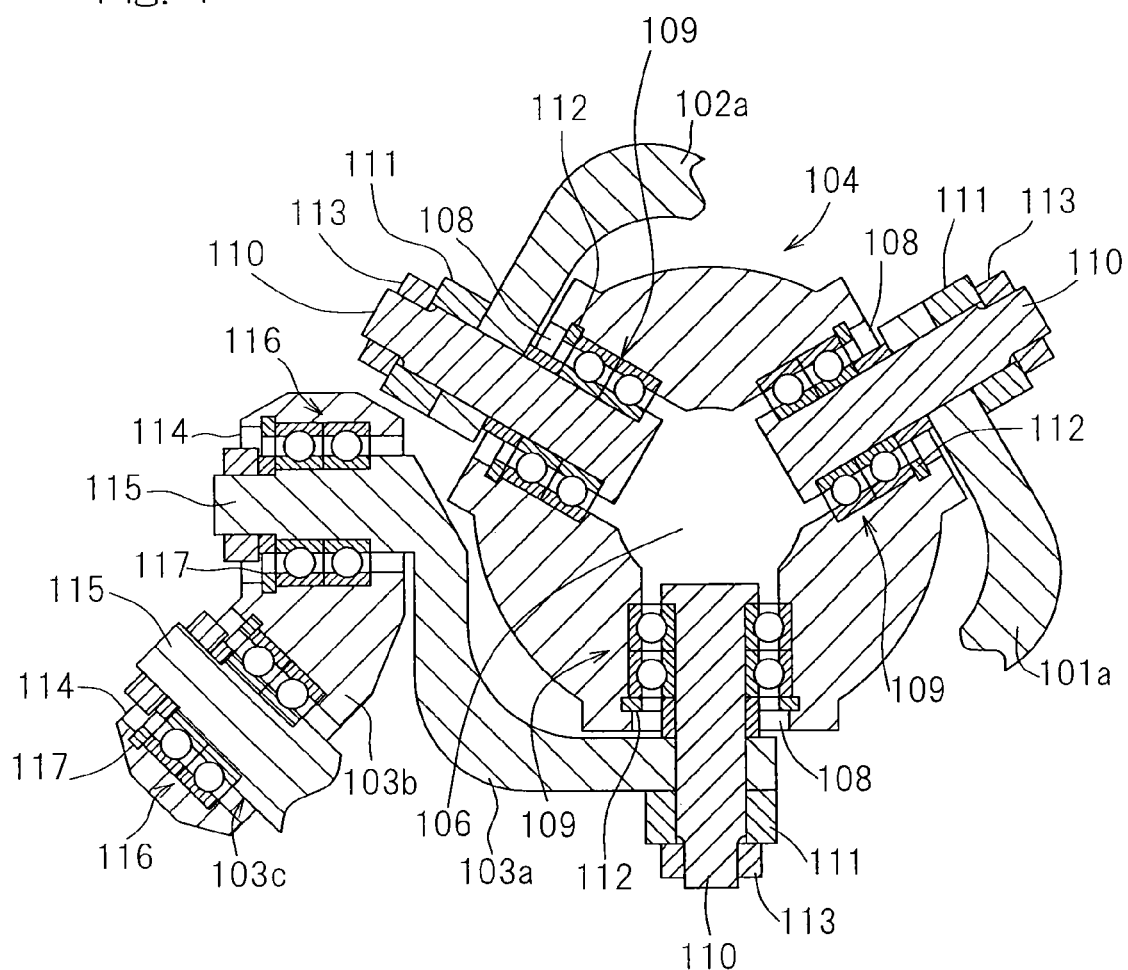
FIG. 4 is a longitudinal sectional view, showing an input member, an end link member on an input side and an intermediate link member of the link actuating device of FIG. 1.

As shown in FIG. 4, the input member 104 is of a structure having its center portion formed with a throughhole 106 for the insertion of a flexible wire therethrough so as to extend in an axial direction; also having an outer appearance so shaped as to represent the shape of a ring-shaped doughnut; further having circumferentially equally spaced through holes 108 for the insertion of respective shaft members therethrough so as to extend in a radial direction; and the shaft members 110 are inserted into the throughholes 108 through associated bearings 109. The output member 105 is of a structure similar to that of the input member 104 with a flexible wire inserting throughhole 106 (best shown in FIG. 3) defined in its center portion so as to extend in an axial direction.

Each of the bearings 109 is made up of a bearing outer ring inserted into the corresponding throughhole 108 in the input member 104, a bearing inner ring mounted externally on the shaft member 110, and rolling elements such as, for example, balls that are rollingly interposed between the bearing outer ring and the bearing inner ring. The shaft member 110 has an one end portion protruding outwardly from the input member 104; and the end portion link member 101a, 102a or 103a and a gear member 111 are connected with the one end portion of the respective shaft member 110 and fixed by means of a nut 113, fastened to the shaft member 110, with a predetermined preload amount having been applied to the associated bearing 109. The gear member 111 forms a part of an angle control mechanism 120 for the link mechanism 101 to 103 as will be described in detail later. The bearing 109 for supporting the shaft member 110 rotatably relative to the input member 104 is locked in position on the input member 104 by means of a retaining ring 112 so as not to separate from the input member 104.

The shaft member 110, the end portion link member 101a to 103a and the gear member 111 are connected by means of, for example, a crimping technique. Alternatively, connection can be accomplished by the use of keys or serrations. In such case, an undesirable loosening of the connecting structure can be prevented and the transmitting torque can be increased.

The provision of the gear member 111 in the outer end portion of the shaft member 110 makes it possible to form a large inner space S at a location inwardly of the flexible wire inserting throughhole 106 in the input member 104 and the associated link mechanism 101 to 103. In this inner space S, the flexible wire 4A is passed therethrough.

For each of the bearings 109, other than the use of two ball bearings such as shown, an angular contact ball bearing, a roller bearing or a slide bearing can be equally employed. It is to be noted that the output member 105 is of a structure identical with that of the input member 104, except that no gear member 111 is provided in an outer end portion of the shaft member 110. Respective circumferential positions of the shaft members 110 may not necessarily be spaced equidistantly from each other in the circumferential direction, but it is necessary that the input member 104 and the output member 105 must have the same positional relation with each other in the circumferential direction. The input member 104 and the output member 105 are commonly shared by the three sets of the link mechanisms 101 to 103, and the end portion link member 101a to 103a and 101c to 103c are connected with each of the shaft members 110.

Each of the end portion link members 101a to 103a and 101c to 103c is of an L-shaped configuration having one side, connected with the associated shaft member 110, which protrudes outwardly from the input member 104 or the output member 105, and the other side connected with the intermediate link member 101b to 103b. Each of the end portion link members 101a to 103a and 101c to 103c is of a shape, in which a bent base end inside of a shank portion 115, which is positioned on the side of a link center, is largely cut out so that a large moving angle can be obtained.

The intermediate link member 101b to 103b is of a substantially L-shaped configuration having a throughhole 114 defined in its both sides. This intermediate link member 101b to 103b is of such a shape that its peripheral side face is largely cut out to enable it to have a large moving angle. The shank portion 115 integrally formed to bend from the other side of the end portion link member 101a to 103a and 101c to 103c is inserted in the throughhole 114 in the intermediate link member 101b to 103b through a respective bearing 116.

Each of those bearings 116 is made up of a bearing outer ring inserted into the throughhole 114 in the intermediate link member 101b to 103b, a bearing inner ring mounted externally on the shank portion 115 of the end link member 101a to 103a and 101c to 103c, and rolling elements in the form of, for example, balls rollingly interposed between the bearing outer ring and the bearing inner ring. The bearing 116 for rotatably supporting the intermediate link member 101b to 103b relative to the end portion link member 101a to 103a and 101c to 103c is retained in position on by a retaining ring 117 so as not to separate from the intermediate link member 101b to 103b.

In each of the link mechanisms 101 to 103, the angle and the length of the shaft member 110 and the geometric shape of the end link member 101a to 103a and 101c to 103c may be equal to each other on the input side and the output side and even the intermediate link member 101b to 103b have its input and output sides that are similar in shape to each other. Also, the angular positional relation, relative to the plane of symmetry of the intermediate link member 101b to 103b, between the intermediate link member 101b to 103b and the end portion link member 101a to 103a and 101c to 103c that are connected with the input and output members 104 and 105 may be similar to each other on the input side and the output side. In such a case, the input side group of the input member 104 and the end portion link member 101a to 103a and the output side group of the output member 105 and the end portion member 101c to 103c will move in the same manner because of the geometrical symmetry and the input and output side groups will rotate the same angle in the same manner at a constant speed. The plane of symmetry of the intermediate link member 101b to 103b when rotating at the constant speed is referred to as an isokinetic bisecting plane.

Because of the foregoing, when a plurality of the link mechanisms 101 to 103 of the same geometric shape having the input and output members 104 and 105 in common are arranged on a circumference, as the position at which those link mechanisms 101 to 103 can move with no ambiguity, the intermediate link members 101b to 103b is limited to the movement on the isokinetic bisecting plane and, hence, the isokinetic rotation can be obtained even when the input and output side groups assume arbitrary working angles.

Each of the link mechanisms 101 to 103 has rotatable portions of the four revolve pairs comprised of a first joint portion between the end portion link member 101a to 103a and the input member 104, a second joint portion between the end portion link member 101c to 103c and the output member 105, a third joint portion between the end portion link member 101a to 103a and the intermediate link members 101b to 103b, and a fourth joint portion between the end portion link member 101c to 103c and the intermediate link members 101b to 103b. By designing these four rotatable portions as respective bearing structure, it is possible to reduce the rotational resistance, while the frictional resistance at those joint portions is suppressed, and hence, not only can a smooth power transmission be secured, but also the durability can be increased.

In this bearing structure, by applying a preload, a radial gap and a thrust gap are minimized to thereby suppress rattling at the joint portions and not only can the constant speed property be maintained with no phase difference between input and output, but also generation of vibrations and noises can also be suppressed. In particular, in the bearing structure of the type discussed above, by rendering the bearing gap to be a negative gap, any backlash, which would occur between input and output, can be minimized.

The link mechanism section 3 in the link actuating device 1A controls the posture in the two degree of freedom of the output member 105, when the angle of the end portion link member 101a to 103a on the input side is controlled relative to the input member 104 with respect to two or more link mechanisms of the link mechanism 101 to 103. In the embodiment now under discussion with reference to FIGS. 1 to 4, the angles of the end portion link member 101a to 103a of all of the link mechanisms 101 to 103 is controlled. An angle control mechanism 120 of the respective end portion link member 101a to 103a is such that, as shown in FIG. 3, the link mechanism drive source 121 is provided on the upper flange portion 5b of the base unit 5 so as to be oriented downwards, a bevel gear 123 is fitted to an output shaft 122 protruding above the upper flange portion 5b of the link mechanism drive source 121, and a geared portion of the gear member 111 fitted to the shaft member 110 of the input member 104 is meshed with the bevel gear 123. The link mechanism drive source 121 is employed in the form of, for example, an electrically driven motor. By rotating the link mechanism drive source 121, its rotation is transmitted to the shaft member 110 through the bevel gear 123 and the gear member 111, and the end portion link member 101a to 103a changes its angle relative to the input member 104.

According to the link mechanism section 3 of the structure described hereinabove, the range of movement of the output member 105 relative to the input member 104 can be made large. By way of example, the maximum bending angle defined between the center axis B of the input member 104 and the center axis C of the output member 105 can be rendered to be about ±90°. Also, the angle of turn of the output member 105 relative to the input member 104 can be made within the range of 0 to 360°. Since the link mechanism drive source 121 for arbitrarily controlling the posture of the output member 105 is provided in the revolve pair of the link mechanisms 101 to 103 connected with the input member 104, the output member 105 can be easily set to an arbitrary posture. Since a force is transmitted from the input member 104 to the output member 105 at constant speed, the operation of the output member 105 is smooth. It is, however, to be noted that although in the above described embodiment, the link mechanism drive source 121 has been shown and described as provided in each set of the revolve pairs of the link mechanisms 101 to 103 and the input member 104, the provision of the link mechanism drive source 121 in two or more sets is effective to make it possible to fix the posture of the output member 105 relative to the input member 104.

Also, the link mechanism section 3 of the structure described hereinabove is of a type, in which not only are the bearing outer rings capsulated within the input and output members 104 and 105, but also the bearing inner rings are connected with the end portion link members 101a to 103a and 101c to 103c, with the bearing structures embedded respectively within the input and output members 104 and 105, and, therefore, without unduly increasing the outer appearance of the whole, the outer appearance of the input and output members 104 and 105 can be enlarged. For this reason, it is easy to secure a fitting space, in which the input member 104 is fitted to the upper flange portion 5b of the base unit 5, and a fitting space, in which a drive device (not shown) is fitted to the output member 105.

Figure 5A:
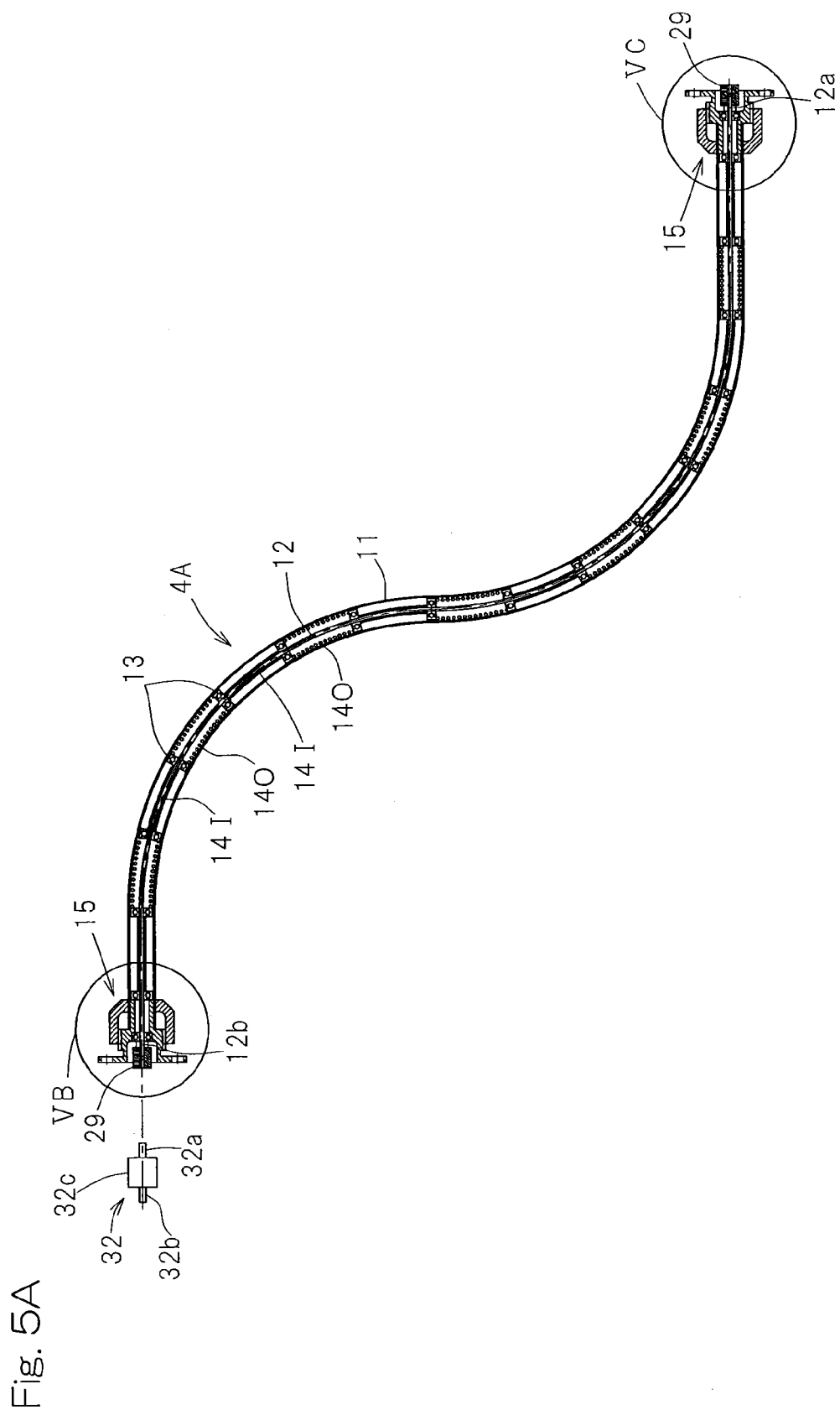
FIG. 5A is a longitudinal sectional view showing a flexible wire of the link actuating device of FIG. 1.
Figure 5B:
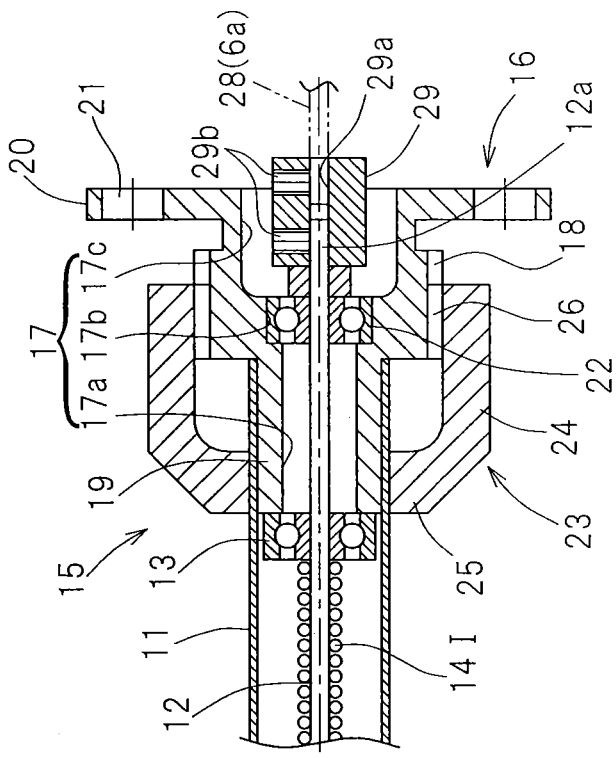
FIG. 5B is a cross sectional view showing, on an enlarged scale, of a portion the flexible wire encircled by VB in FIG. 5A.
Figure 5C:
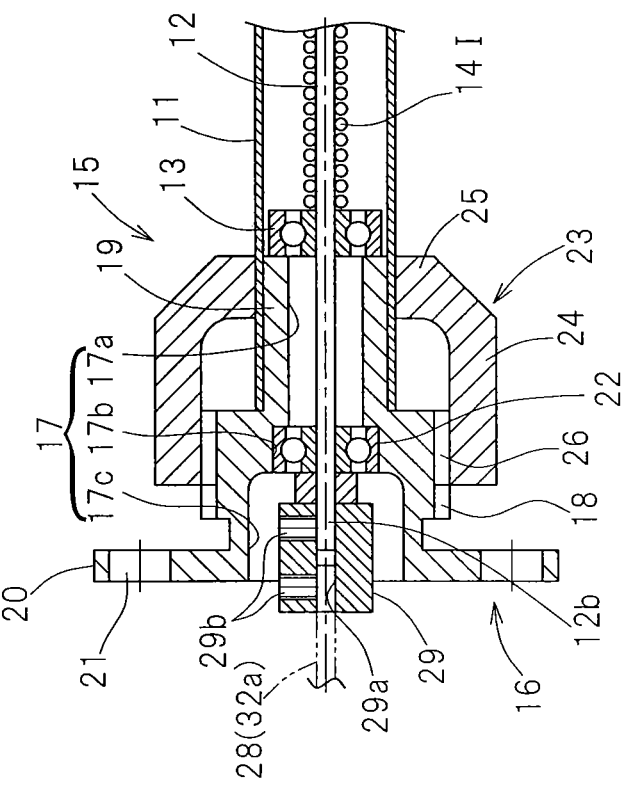
FIG. 5C is a cross sectional view showing, on an enlarged scale, of another portion of the flexible wire encircled by VC in FIG. 5A.

The details of the flexible wire 4A referred to hereinbefore are shown in FIGS. 5A to 5C. The flexible wire 4A includes a flexible outer tube 11, a flexible inner wire 12 provided at a center position within the outer tube 11, and a plurality of rolling bearings 13 for rotatably supporting the inner wire 12 relative to the outer tube 11. The inner wire 12 has its opposite ends which will become an input end 12a and an output end 12b for rotation, respectively. On the output end 12b side of the inner wire 12, a reduction gear 32 as will be detailed later is provided. The outer tube 11 is made of, for example, a resinous material. For the inner wire 12, a wire made of, for example, metal, resin or glass fibers is employed. The wire may be in the form of a single wire or a twisted wire.

The rolling bearings 13 are disposed along a center line of the outer tube 11 and spaced a distance from each other, and spring elements 14I and 14O for applying respective preloads to those rolling bearings 13 are provided between the neighboring rolling bearings 13. The spring elements 14I and 14O are in the form of, for example, compression coils and are provided as if a winding wire is wound around an outer periphery of the inner wire 12. The spring elements includes an inner ring spring element 14I for generating the preload in the inner ring of the rolling bearing 13 and an outer ring spring element 14O for generating the preload in the outer ring, and they are arranged alternately.

The outer tube 11 has its opposite ends each provided with a coupling member 15 for connecting the outer tube 11 with an external member. The coupling member 15 is made up of a male threaded member 16 and a female threaded member 23. The male threaded member 16 is in the form of a tubular member having an inner periphery formed with a throughhole 17 and is formed with a male threaded portion 18 in an outer periphery thereof at an intermediate location in an axial direction thereof. One end, i.e., a first end, of the male threaded member 16 in the axial direction is provided with an axially extending cylindrical portion 19. The outer diameter of this cylindrical portion 19 is so chosen as to be a value enough to be press-fitted to an inner diameter portion of the outer tube 11. Also, the opposite end, i.e., a second end, of the male threaded member 16 in the axial direction is provided with a radially outwardly extending flange portion 20. This flange portion 20 forms a connecting unit for connecting it with an external member and has a plurality of circumferential portions formed with respective insertion holes 21 for the insertion of fixing members such as, for example, bolts therethrough. The throughhole 17 referred to previously has its inner diameter decreasing so stepwise as to define a small diameter portion 17a, an intermediate diameter portion 17b and a large diameter portion 17c in this order from the side of the cylindrical portion 19 towards the side of the flange portion 20. The intermediate diameter portion 17b has a rolling bearing 22 inserted thereinto for rotatably supporting the inner wire 12.

On the other hand, the female threaded member 23 is in the form of a tubular member having a cylindrical portion 24 and a collar shaped portion 25 extending from one end of the cylindrical portion 24 in a direction radially inwardly thereof, and a female threaded portion 26 engageable with the male threaded portion 18 of the male threaded member 16 is formed on an inner peripheral of a tip end portion of the cylindrical portion 24. The collar shaped portion 25 has an inner diameter so chosen as to be press-fitted to the outer periphery of the outer tube 11.

In order to connect the outer tube 11 with the external member, the cylindrical portion 19 of the male threaded member 16 is first engaged in an inner diameter portion of the outer tube 11, and the collar shaped portion 25 of the female threaded member 23 is then engaged with an outer diameter portion of the outer tube 11 and, starting from this condition, the male threaded portion 18 of the male threaded member 16 and the female threaded portion 26 of the female threaded member 23 are engaged with each other. By so doing, the cylindrical portion 19 of the male threaded member 16 cooperates with the collar shaped portion 25 of the female threaded member 23 to fixedly sandwich one end of the outer tube 11 from inside and outside. The inner wire 12 is passed through the throughhole 17 of the male threaded member 16 and is supported by the rolling bearing 22 inserted into the intermediate diameter portion 17b of the throughhole 17. Thereafter, the flange portion 20 of the male threaded member 16 is connected with an object to be connected such as, for example, the rotary drive source 6 or any other driven device (not shown). This connection is accomplished by a fixing member (not shown) such as, for example, a bolt inserted through the insertion hole 21. In this way, the connection between the outer tube 11 and the external member completes and the condition as shown in FIG. 5A establishes.

Starting from this condition, when the male threaded portion 18 is disengaged from the female threaded portion 26, the outer tube 11 is released from the restraint then accomplished by the cylindrical portion 19 of the male threaded portion 16 and the collar shaped portion 25 of the female threaded member 23 and, hence, the connection between the outer tube 11 and the object to be connected is disconnected. Connecting and disconnecting procedures between the outer tube 11 and the external member are easy to perform.

Also, starting from the condition in which the outer tube 11 and the coupling member 15 are connected together, the connecting and disconnecting procedures between the flexible wire 4A and the external member may be performed by means of a connecting unit (flange portion 20) of the male threaded member 16. Yet, the connecting and disconnecting procedures between the flexible wire 4A and the external member become easy to perform.

The input and output ends 12a and 12b of the inner wire 12 are each provided with a coupling 29 for connection with a rotary shaft. The rotary shaft that may be connected with the input end 12a of the inner wire 12 is the output shaft 6a of the rotary drive source 6 referred to previously, and the rotary shaft that will be connected with the output end 12b of the inner wire 12 is an input shaft 32a of the reduction gear 32 as will be detailed later. It is to be noted that in the following description that follows, the output shaft 6a of the rotary drive source 6 and the input shaft 32a of the reduction gear 32 will be collectively referred to as a rotary shaft 28.

The coupling 29 in the illustrated instance has a throughhole 29a extending in a direction axially thereof, and an axially spaced, two threaded holes 29b are provided as radially extending between this throughhole 29a and an outer periphery surface. The inner wire 12 and the rotary shaft 28 are inserted into the throughhole 29a from both sides thereof, and a tip of a threaded member (not shown) such as, for example, a bolt threadingly engaged within the threaded hole 29b is held in contact with the inner wire 12 and the rotary shaft 28 to urge the latter to thereby connect the inner wire 12 and the rotary shaft 28 together.

It is also to be noted that the coupling 29 may be of any suitable construction other than that described above, provided that it functions to connect the inner wire 12 and the rotary shaft 28 with each other for rotation together therewith. By way of example, the coupling 29 may have such a structure as shown in FIGS. 6A to 6C and FIG. 7. This coupling 29 is made up of a wire side member 30 rotatable together with the inner wire 12 and a shaft side member 31 rotatable together with the rotary shaft 28. The wire side member 30 and the inner wire 12, and the shaft side member 31 and the rotary shaft 28, are fixedly connected together by means of a press fitting or by means of a fixing member (not shown) such as, for example, a bolt. Respective end faces of the wire side member 30 and the shaft side member 31, which confronts with each other, are formed with a radial groove 30a and a projection 31a engageable in the radial groove 30a, respectively. In the instance as shown, the radial groove 30 and the projection 31a are each provided at two locations in a circumferential direction of the radial groove 30 and the projection 31a.

Figure 6A:
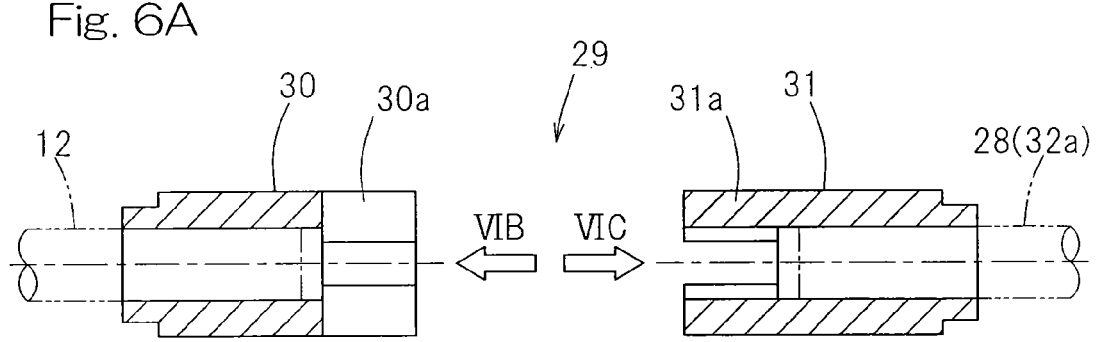
FIG. 6A is a longitudinal sectional view showing a coupling in a disconnected condition.
Figure 6B:
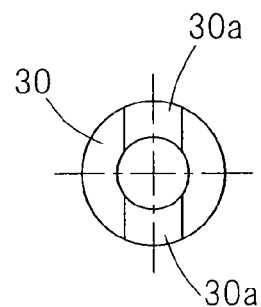
FIG. 6B is an end view of the coupling as viewed in a direction shown by the arrow VIB in FIG. 6A.
Figure 6C:
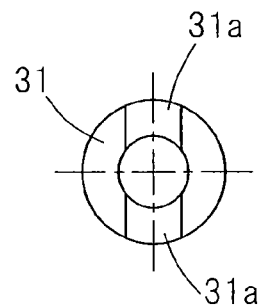
FIG. 6C is an end view of the coupling as viewed in a direction shown by the arrow VIC in FIG. 6A.
Figure 7:
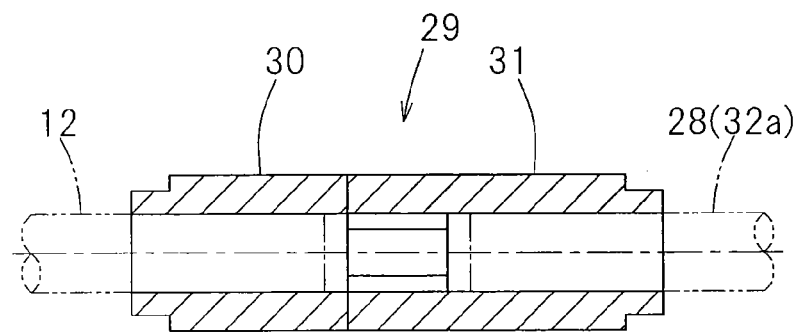
FIG. 7 is a longitudinal sectional view showing the coupling in a connected condition.

In order to connect the inner wire 12 with the rotary shaft 28, the wire side member 30 and the shaft side member 31, which are held in position to confront with each other as shown in FIG. 6A, have to be axially relatively moved in a direction towards each other so as to approach to each other and the radial groove 30a, shown in FIG. 6B, and the projection 31a, shown in FIG. 6C, are engaged with each other, thereby completing the connection between the wire side member 30 and the shaft side member 31 with each other so that the torque can be transmitted therebetween. In order to release the rotary shaft 28 from the inner wire 12, in a manner reverse to that described above, the wire side member 30 and the shaft side member 31 are to be axially relatively moved in a direction away from each other to disengage the projection 31a from the radial groove 30a. The connecting and disconnecting between the inner wire 12 and the rotary shaft 28 are easy to perform.

As shown in FIGS. 5A to 5C, the output side of the flexible wire 4A is provided with the reduction gear 32 for reducing the rotation of the inner wire 12. This reduction gear 32 has a reduction gear housing 32c to support an input shaft 32a and an output shaft 32b, which protrude from the reduction gear housing 32 forwards and rearwards, respectively, and a rotation reducing and transmitting system (not shown) provided within the reduction gear housing 32c for reducing the rotation of the input shaft 32a and then transmitting it to the output shaft 32b. In the instance as shown, the input shaft 32a and the output shaft 32b are disposed on the same axis. For the rotation reducing and transmitting system of the reduction gear 32, a planetary gear mechanism, a harmonic drive gearing or the like can be employed. The input shaft 32a of the reduction gear 32 is connected with the output end 12b of the inner wire 12 through the coupling 29. The output shaft 32b of the reduction gear 32 is connected with an external drive device (not shown).

Since the flexible wire 4A of the structure described above is such that the use is made of the reduction gear 32 on the output side of the inner wire 12 for reducing and then outputting the rotation of the inner wire 12, a high torque can be generated even though the torque to be transmitted through the inner wire 12 is low. If the torque to be transmitted through the inner wire 12 is low, a thin inner wire 12 can be used. For this reason, with a compact structure, the flexible wire 4A having a high flexibility can be realized. Also, since the spring elements 14I and 14O for applying the preloads to the rolling bearings 13 are provided between the neighboring rolling bearings 13, it is possible to prevent the natural frequency of the inner wire 12 from lowering, and the inner wire 12 can be therefore rotated at a high speed. Since the inner ring spring element 14I and the outer ring spring element 14O are alternately arranged in the direction lengthwise of the inner wire 12, the spring elements 14I and 14O can be provided without the outer tube 11 being unduly increased in its diameter.

Figure 8:
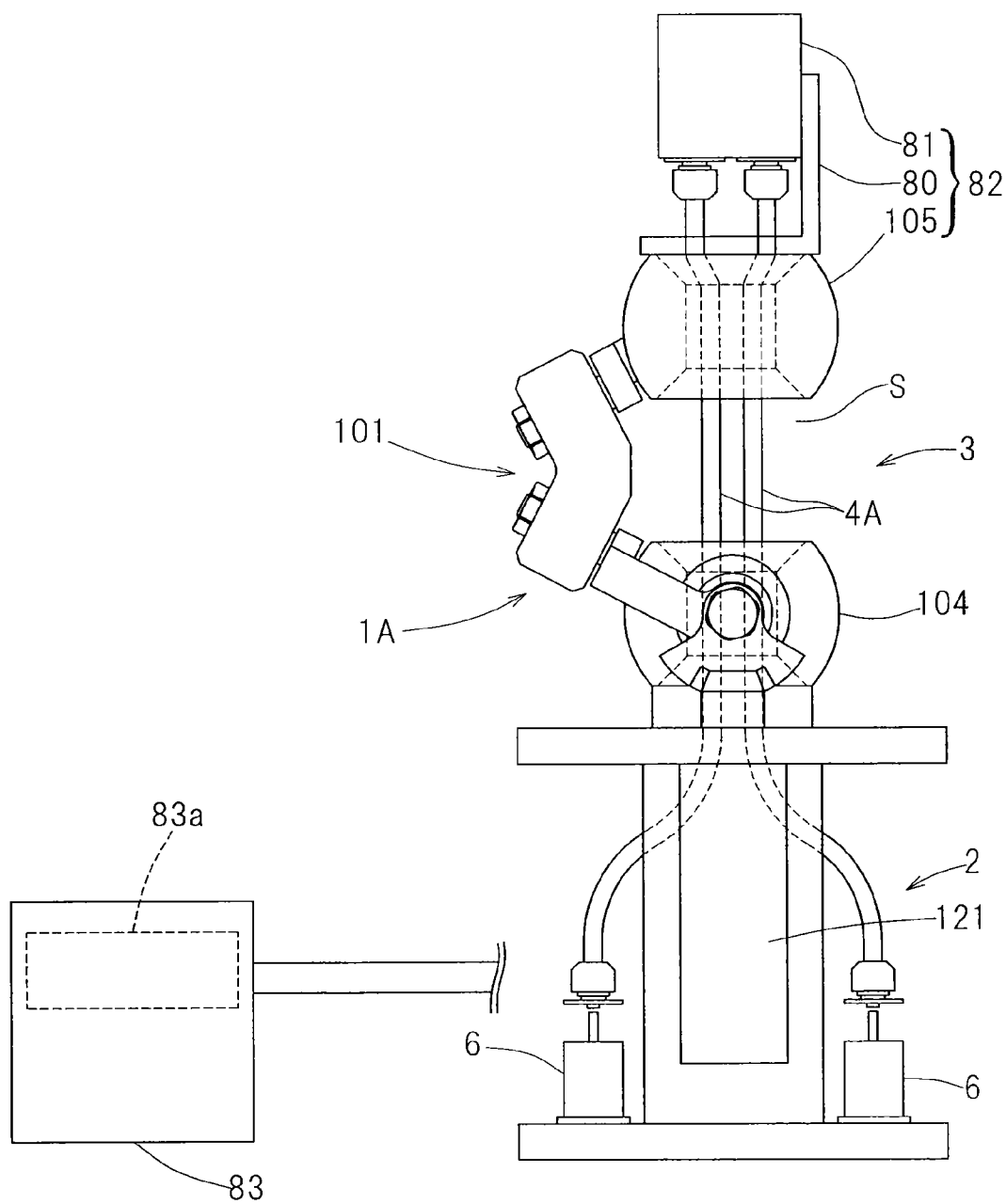
FIG. 8 is a diagram showing a schematic structure of a remote controlled robot equipped with the link actuating device of FIG. 1.

This link actuating device 1A is of such a construction as hereinabove described and, as shown in, for example, FIG. 8, a driven device 81 is fitted to the output member 105 through a driven device fitting member 80 and, for example, is used as a remote controlled robot for a medical equipment. The driven device 81 is a device for actuating a processing tool (not shown) such as, for example, a drill or any other equipments, and a driven mechanism (not shown) therefor may be either a rotary mechanism or a direct acting mechanism. The input side of the flexible wire 4A is connected with the rotary drive source 6 and the output side thereof is connected with the driven mechanism for the driven device 81 through a reduction gear (not shown). The output member 105, the driven device fitting member 80 and the driven device 81 cooperate with each other to define a movable section 82 movable relative to the drive section 2. By controlling the rotary drive source 6 and an output of the link mechanism drive source 121 by means of a controller 83, positioning and attitude altering of the movable section 82 (precisely, the processing tool or equipment) and the control of the driven mechanism for the driven device 81 are accomplished by remote control.

The remote controlled robot referred to above is such that a two-degree-of-freedom mechanism that permits the movable section 82 to move in two axis directions perpendicular to each other is constituted by the three sets of the link mechanisms 101 to 103 and the link mechanism drive source 121 provided for each of those link mechanisms 101 to 103. This two-degree-of-freedom mechanism has a large range of movement for the movable section 82. For this reason, the positioning of the movable section 82 can be accomplished precisely.

So that the flexible wire 4A may be provided through the inner space S of each of the link mechanisms 101 to 103 and the rotational force may then be transmitted by the flexible wire 4A from the input side to the output side, the driven device 81 of the movable section 82 can be driven by the rotary drive source 6 provided in the drive section 2. Because of it, the weight of the movable section 82 is reduced. As a result, the inertia moment acting on the link mechanisms 101 to 103 becomes small and the link mechanism drive source 121 can be made compact in structure. Also, if the movable section 82 is lightweight, it is easy to handle and the positioning accuracy of the driven device 81 increases. In addition, since the driven device 81 and the rotary drive source 82 and the link mechanism drive source 121 can be disposed having been spaced a substantial distance from each other, the driven device 81 can be easily kept in a clean condition. Since the flexible wire 4A is provided having been passed through the inner spaces S in the link mechanisms 101 to 103, the flexible wire 4A can be easily wired and the flexible wire 4A can be prevented from constituting an obstruction.

Also, since the flexible wire 4A has a flexibility, the rotational force can be assuredly transmitted from the input side to the output side even when the respective postures of the link mechanisms 101 to 103 are changed in order to facilitate the position control of the movable section 82. Yet, since the distance L between the spherical link centers on the input side and the output side does not change even if the respective postures of the link mechanisms 101 to 103 change, there is no possibility that a large axial force (a tensile force) acts on the flexible wire 4A and, hence, the rotational force can be assuredly transmitted.

Figure 9:
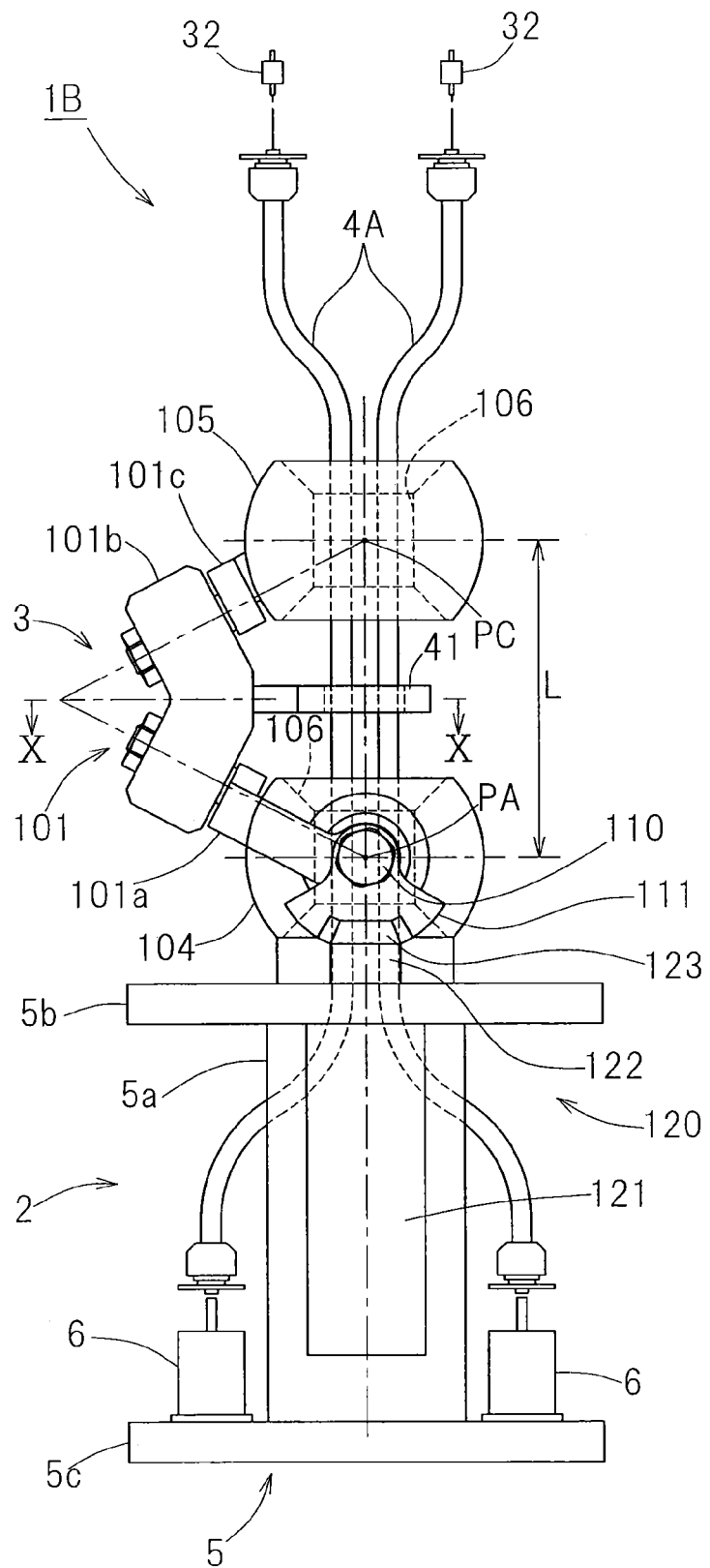
FIG. 9 is a front elevational view showing, with a portion cut out, the link actuating mechanism designed according to a second preferred embodiment of the present invention.
Figure 10:
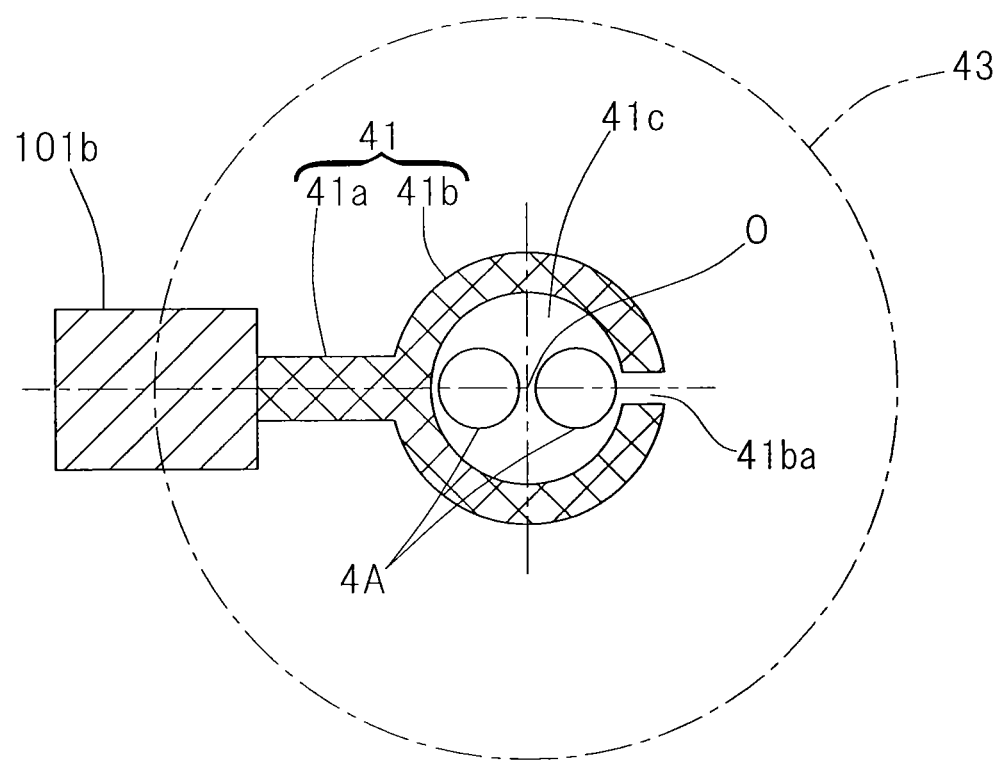
FIG. 10 is a cross sectional view taken along the line X-X in FIG. 9.

FIGS. 9 and 10 illustrate a second preferred embodiment of the present invention. The link actuating device, now generally identified by 1B, is such that a wire guide member 41 is fixedly provided in the intermediate link member 101b of one link mechanism 101 so that the flexible wire 4A can be guided by the wire guide member 41. The wire guide member 41 is made up of a support unit 41a, having its base end fixed to the intermediate link member 101b, and a C-shaped guide unit 41b provided integrally with a tip of the support unit 41a. The guide unit 41b has a slit 41ba of a size enough to allow the flexible wire 4A not to pass therethrough, and is formed with a round opening 41c defined at a center thereof for the passage of the flexible wire 4A therethrough. The round opening 41c has a center thereof which is aligned with a center O of a circular trajectory 43 of movement of the intermediate link member 101b.

Regardless of the respective postures assumed by the link mechanisms 101 to 103, the intermediate link members of at least two link mechanisms out of the three link mechanisms 101 to 103 move along one circular trajectory 43. For this reason, if the flexible wire 4A is guided by the wire guide member 41 fixed to the intermediate link member 101b, interference of the flexible wire 4A with any other member, for example, the remaining intermediate link members 102b and 103b and/or the end portion link members 102a, 102c, 103a and 103c can be avoided. Also, since the center O of the circular trajectory 43 of the intermediate link member 101b lies at all times on the straight line that connects between the spherical surface link centers on the input side and the output side and the distance L between the spherical surface link centers remains constant even when the posture of each of the link mechanisms 101 to 103 changes, the alignment of the center of the guide unit 41b of the wire guide member 41 with the center O of the circular trajectory 43 of the intermediate link member 101b makes it possible to dispose the flexible wire 4A, at a minimum distance, in the position where no change in distance occurs.

Figure 11:
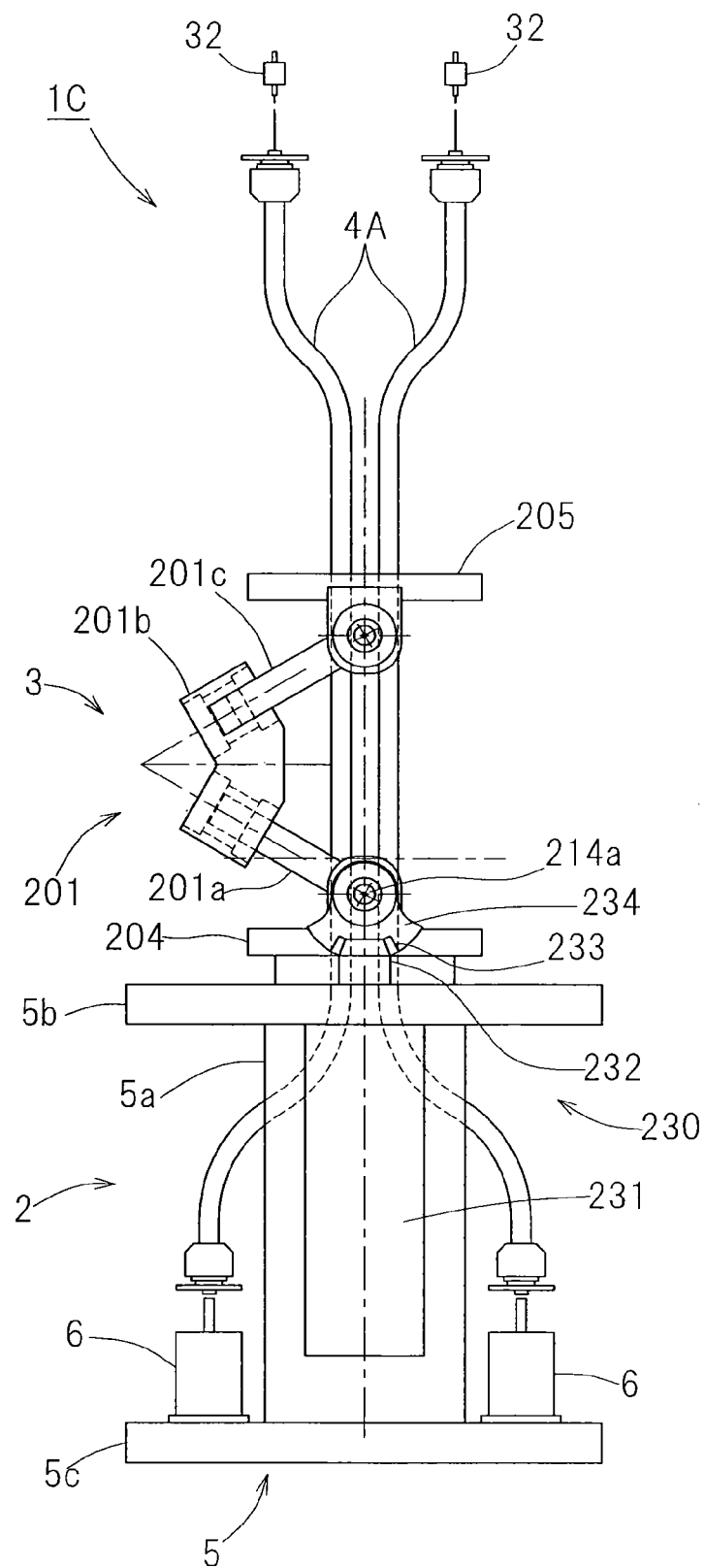
FIG. 11 is a front elevational view showing, with a portion cut out, the link actuating mechanism designed according a third preferred embodiment of the present invention.
Figure 12:
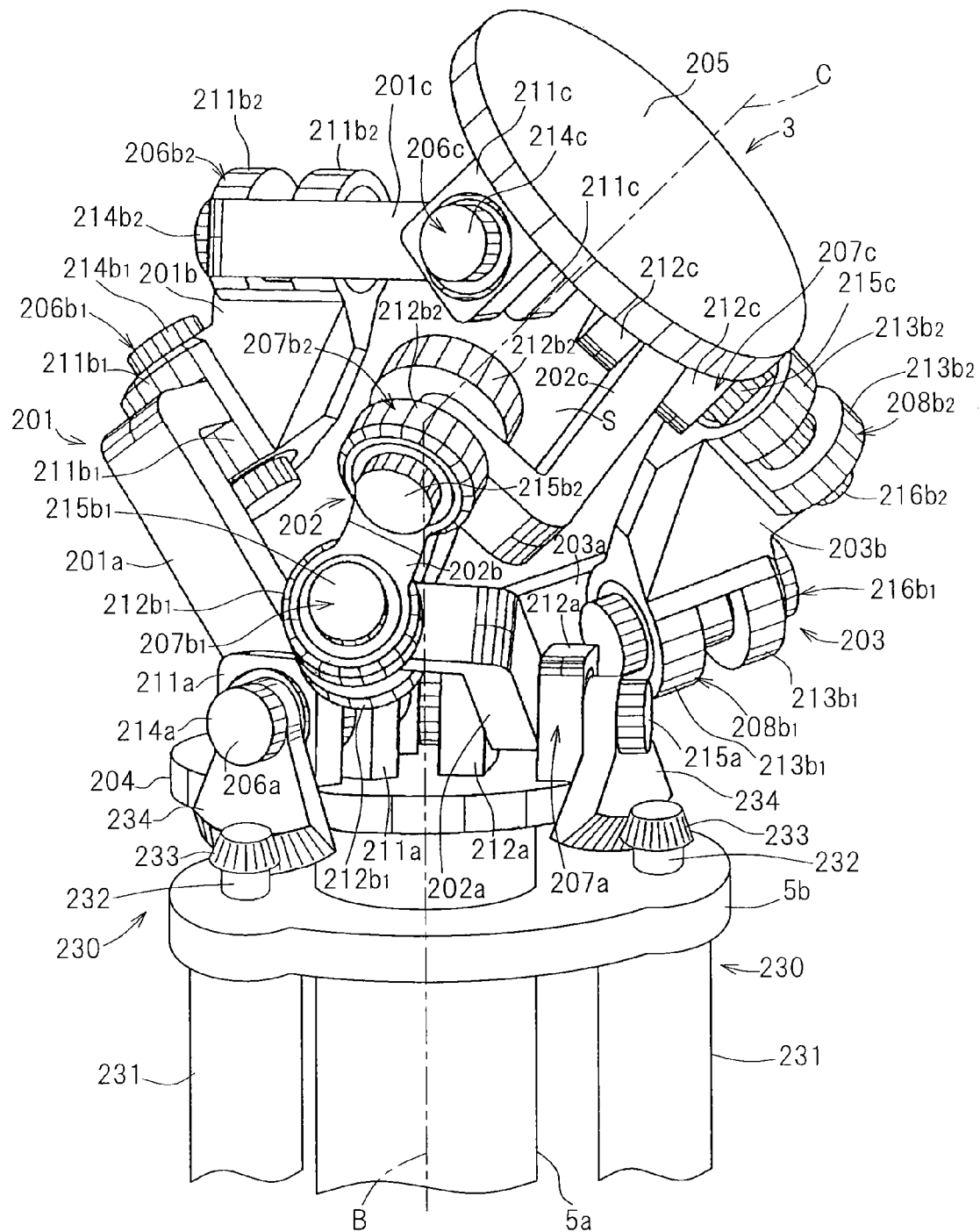
FIG. 12 is a perspective view of the link actuating mechanism of FIG. 11.
Figure 13:
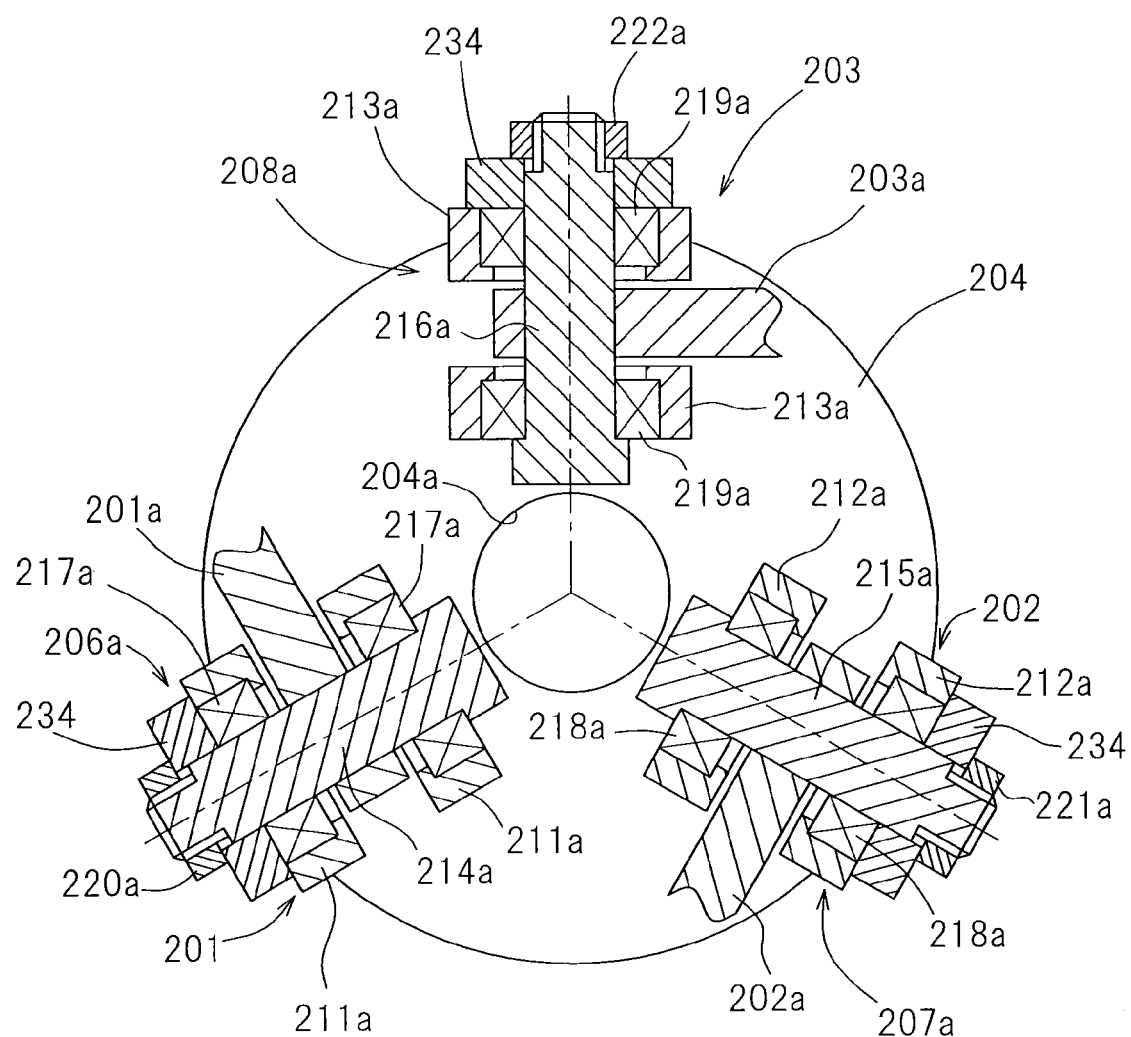
FIG. 13 is a longitudinal sectional view showing a revolve pair portion between the input member and the end link member on the input side of the link actuating device of FIG. 11.

FIGS. 11 to 13 illustrate a third preferred embodiment of the present invention. The link actuating device, now generally identified by 1C, has a link mechanism section 3 that is different in structure from that employed in the practice of the foregoing embodiments. As best shown in FIG. 12, the link mechanism section 3 used in this link actuating device 1C makes use of three sets of link mechanisms 201, 202 and 203 (hereinafter designated as 201 to 203). It is to be noted that FIG. 11 illustrates only one set of the link mechanism 201. Those three sets of the link devices 201 to 203 are of the geometrically identical shape. The input side of the link mechanism 201 to 203 is mounted on the flange portion 5b of the base unit 5.

Each of the link mechanisms 201, 202 and 203 is made up of an end portion link member 201a, 202a and 203a (hereinafter designated as 201a to 203a) on the input side, which is rotatably connected with a disc shaped input member 204, an end portion link member 201c, 202c and 203c (hereinafter designated as 201c to 201c) on an output side, which is rotatably connected with a disc shaped output member 205, and an intermediate link member 201b, 202b and 203b (hereinafter designated as 201b to 203b) which is rotatably connected with the opposite end portion link members 201a to 203a and 201c to 203c and connecting the opposite end portion link members 201a to 203a and 201c to 203c together. Each of the link mechanisms 201, 202 and 203 is comprised of a three-link chain mechanism including four revolve pairs 206a, 207a and 208a (hereinafter designated as 206a to 208a), 206b1, 207b1 and 208b1 (hereinafter designated as 206b1 to 208b1), 206b2, 207b2 and 208b2 (hereinafter designated as 206b2 to 208b2), and 206c, 207c and 208c (hereinafter designated as 206c to 208c). It is to be noted that in FIG. 12, the revolve pairs 208a and 208c are not shown because of them being hidden. The revolve pair 208a is however shown in FIG. 13. The revolve pair 208c, although not shown in the accompanying drawings, is given the reference numeral in this specification for the sake of clarity.

Each of the end portion link members 201a to 203a and 201c to 203c is of a spherical surface link structure and respective spherical surface link centers in the three sets of the link mechanisms 201 to 203 are matched with each other and, also, the distances from those centers to associated end portion link members 201a to 203a and 201c to 203c remain the same. Connecting shafts of the revolve pairs 206b1 to 208b1 and 206b2 to 208b2 with the end portion link members 201a to 203a and 201c to 203c may form a crossed axes angle or may be parallel to each other. The respective shapes of the intermediate link members 201b to 203b in the three sets of the link mechanisms 201 to 203 are geometrically identical with each other.

The link mechanism 201 to 203 according to this embodiment is of a mirror symmetric type and the positional relation between an input side group of the input member 204 and the end portion link member 201a to 203a on the input side and an output side group of the output member 205 and the end portion link member 201c to 203c on the output side is such as to represent a positional construction having the mirror symmetry with respect to the center line of the intermediate link member 201b to 203b. In FIG. 12, the output member 205 is shown as assuming a predetermined working angle relative to the input member 204.

FIG. 13 illustrates the revolve pairs 206a to 208a of the input member 204 and the end portion link member 201a to 203a on the input side. On an upper surface of the disc shaped input member 204, a pair of support members 211a, 212a and 213a (hereinafter designated as 211a to 213a) employed for each of the link mechanisms 201 to 203 are disposed. The support members 211a to 213a, although being of a construction that can be removably fitted to the input member 204 by means of screws in this embodiment, can be formed integrally with the input member 204. One pair of the support members 211a to 213a has a respective bearing 217a, 218a and 219a (hereinafter designated by 217a to 219a) fitted thereto, and a support rod 214a, 215a and 216a (hereinafter designated as 214a to 216a) is supported rotatably by this pair of the bearings 217a to 219a, to which support rod one arm end portion of the L-shaped end portion link member 201a to 203a, while inserted in between the pair of the support members 211a to 213a, is connected.

Also, to the outside of the pair of the support members 211a to 213a in the support rods 214a to 216a, a gear member 234 forming a part of an angle control mechanism 230 as will be detailed later is connected. The arm end portion of the end portion link member 201a to 203a and the gear member 234 are fixed to the support rod 214a to 216a by means of, for example, a retaining screw.

In addition, nuts 220a, 221a and 222a (hereinafter designated as 220a to 222a) are threadingly mounted on respective outer end portions of the support rods 214a to 216a, and with associated spacers or the like intervened as a result of fastening of the nuts 220a to 222a, predetermined preload amounts are adjustably applied to the bearings 217a to 219a.

Although circumferential positions of the support members 211a to 213a may not be spaced an equal distance from each other, it is necessary that the input member 204 and the output member 205 must have the same circumferential positional relation of the support members 211a to 213a. The input member 204 and the output member 205 are commonly shared by the three sets of the link mechanisms 201 to 203, and with the support members 211a to 213a and 211c to 213c, the end portion link members 201a to 203a and 201c to 203c are connected, respectively. The input member 204 and the output member 204, to which the support members 211a to 213a and 211c to 213c are fitted, although shown and described as employed in the form of disc shaped members in this embodiment, may be of any suitable shape provided that fitting spaces for the support members 211a to 213a and 211c to 213c can be secured. In this embodiment, both of the input member 204 and the output member 205 are rendered to represent the shape of a perforated disc having a throughhole 204a (a throughhole in the output member 205 is not shown) defined at a center portion thereof, and through throughholes 204a in the input member 204 and the output member 205 and the inner spaces S in the link mechanisms 201 to 203, the flexible wire 4A (best shown in FIG. 11) is provided.

The revolve pair 206c to 208c, which is a joint between the output member 205 and the end portion link member 201c to 203c on the output side, is identical in structure with the revolve pair 206a to 208a, which is a joint between the input member 204 and the end portion link member 201a to 203a on the input side and, therefore, the details are not reiterated for the sake of brevity.

In the revolve pair 206b1 to 208b1 of the end portion link member 201a to 203a on the input side and one end portion of the intermediate link member 201b to 203b, the other arm end portion of the end portion link member 201a to 203a on the input side is connected with one end portion of the substantially L-shaped intermediate link member 201b to 203b. Such one end portion of this intermediate link member 201b to 203b is provided with a pair of support members 211b1 to 213b1. Bearings (not shown) are fitted to this pair of the support members 211b1 to 213b1 and, to support rods 214b1, 215b1 and 216b1 (hereinafter designated as 214b1 to 216b1) that are rotatably supported between the pair of the bearings, the other arm end portion of the L-shaped end portion link member 201a to 203a are, while arranged having been inserted in between the pair of the support member 211b1 to 213b1, connected. The support member 211b1 to 213b1 referred to above may be of a structure removable relative to the intermediate link member 201b to 203b by means of a screw or may be of one piece construction.

The arm end portion of the end portion link member 201a to 203a is fixed to the support rod 214b1 to 216b1 by means of a set screw. The fixing method thereof may be with the use of a key or a D-cut or the like other than the use of the set screw referred to above. Also, the support rod 214b1 to 216b1 has one end adjustable while a predetermined preload amount is applied to the bearing with a spacer intervening as a result of fastening of a nut.

The revolve pair 206b2 to 208b2, which is a joint between the other arm end portion of the end portion link member 201c to 203c on the output side and the other end portion of the intermediate link member 201b to 203b, is identical in construction with the revolve pair 206b1 to 208b1 between the other arm end portion of the previously described end portion link member 201a to 203a and the one end of the intermediate link member 201b to 203b and, therefore, the details are not reiterated for the sake of brevity.

In the link mechanism 201 to 203 referred to above, when the angles and the lengths of the support rods 214a to 216a and 214c to 216c of the input member 204 and the output member 205 and the geometrical shapes of the end portion link members 201a to 203a may be equal to each other on the input side and the output side and even the intermediate link member 201b to 203b have its input and output sides that are similar in shape to each other. Also, the angular positional relations, relative to the plane of symmetry of the intermediate link member 201b to 203b, between the intermediate link member 201b to 203b and the end portion link members 201a to 203a and 201c to 203c, which are connected with the input and output members 204 and 205, may be similar to each other on the input side and the output side. In such a case, the input side group of the input member 204 and the end link member 201a to 203a and the output side group of the output member 205 and the end portion link member 201c to 203c will move in the same manner because of the geometrical symmetry and the input and output side groups will rotate the same angle in the same manner at a constant speed. The plane of symmetry of the intermediate link member 201b to 203b, when rotating at the constant speed, is referred to as an isokinetic bisecting plane.

For the reason discussed above, when a plurality of the link mechanisms 201 to 203 of the same geometric shape having the input member 204 and the output member 205 in common are arranged on the circumference, as a position at which the plurality of the link mechanisms 201 to 203 can move with no ambiguity, the intermediate link member 201b to 203b is limited to the movement on the isokinetic bisecting plane and, accordingly, the isokinetic rotation can be obtained even when the input and output side groups assume an arbitrary working angle.

The link mechanism section 3 of the link actuating device 1C controls the posture in the two degree of freedom of the output member 205, when the angle of the end portion link member 201a to 203a on the input side is controlled relative to the input member 204 with respect to two or more link mechanisms of the link mechanisms 201 to 203. In the embodiment shown in FIGS. 11 to 13, the angle of the end portion link member 201a to 203a of all of the link mechanisms 201 to 203 is controlled. The angle control mechanism 230 of the respective end portion link member 201a to 203a is such that, as shown in FIG. 11, a link mechanism drive source 231 is provided on the upper flange portion 5b of the base unit 5 so as to be oriented downwards, a bevel gear 233 is fitted to an output shaft 232 protruding above the upper flange portion 5b of the link mechanism drive source 231, and a gear portion of the gear member 234 fitted to the support rod 214a to 216a of the input member 204 is engaged with the bevel gear 233. The link mechanism drive source 231 is employed in the form of, for example, an electrically operated motor. By rotating the link mechanism drive source 231, its rotation is transmitted to the support rod 214a to 216a through the bevel gear 233 and the gear member 234 and, accordingly, the end portion link member 201a to 203a changes its angle relative to the input member 204.

According to this link mechanism section 3, a range of movement of the output member 205 relative to the input member 204 can be made large. For example, the maximum bending angle defined between the center axis B of the input member 204 and the center axis C of the output member 205 can be rendered to be about ±90°. Also, the angle of turn of the output member 205 relative to the input member 204 can be made within the range of 0 to 360°. Since the link mechanism drive source 231 for arbitrarily controlling the posture of the output member 205 is provided in the revolve pair 206a to 208a of the input member 204 and each of the link mechanisms 201 to 203, the output member 205 can be easily set to an arbitrary posture. Since a force is transmitted from the input member 204 to the output member 205 at constant speed, the operation of the output member 205 becomes smooth. It is, however, to be noted that although in the above described embodiment, the link mechanism drive source 231 has been shown and described as provided in each set of the revolve pairs 206a to 208a of the link mechanisms 201 to 203 and the input member 204, the provision of the link mechanism drive source 231 in two or more sets is effective to make it possible to fix the posture of the output member 205 relative to the input member 204.

Each of the link mechanisms 201 to 203 has rotatable portions of the four revolve pairs 206a to 208a, 206b1 to 208b1, 206b2 to 208b2 and 206c to 208c comprised of a first joint portion between the end portion link member 201a to 203a and the input member 204, a second joint portion between the end portion link member 201a to 203a and the intermediate link members 201b to 203b, a third joint portion between the end portion link member 201c to 203c and the intermediate link members 201b to 203b, and a fourth joint portion between the end portion link member 201c to 203c and the output member 205. By designing these four rotatable portions as respective bearing structure, it is possible to reduce the rotational resistance while the frictional resistance at those joint portions is suppressed, and hence, not only can a smooth power transmission be secured, but also the durability can be increased.

Furthermore, in view of the fact that the bearings are disposed in the revolve pairs 206a to 208a, 206b1 to 208b1, 206b2 to 208b2 and 206c to 208c so that the revolve pairs 206a to 208a, 206b1 to 208b1, 206b2 to 208b2 and 206c to 208c of the link mechanisms 201 to 203 can be supported at both ends, the bearing rigidity can be increased. Also, since component parts may become detachable at portions other than the revolve pairs, the assemblability can be increased. As a result of the increase in assemblability, compactization of the link mechanisms 201 to 203 can also be easily realized.

For the flexible wire 4A, what has been discussed in connection with the link actuating device 1A according to the first described embodiment can be equally employed. Even this link actuating device 1C is utilized as a remote controlled robot in the medical equipment when a driven device (not shown) is fitted to the output member 205 in a manner similar to that according to the previously described embodiment. In such case, functions and effects similar to those afforded by the previously described embodiment can be obtained.

Figure 14:
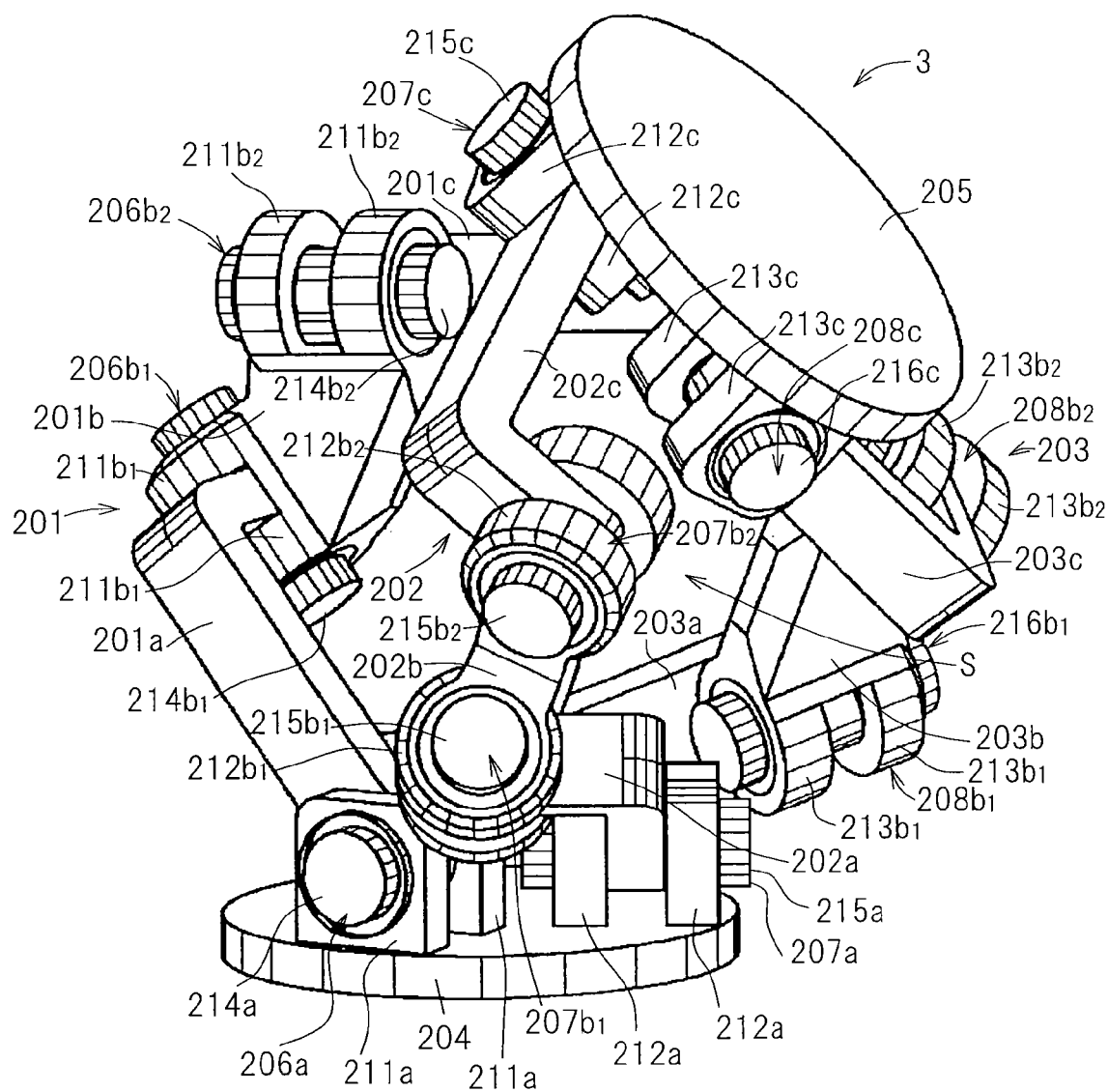
FIG. 14 is a perspective view showing the link actuating device designed according to a fourth preferred embodiment of the present invention.

While the link mechanism section 3 designed in accordance with the third embodiment shown in FIG. 12 is such that the link mechanisms 201 to 203 are of the mirror symmetric type as hereinbefore described, the link mechanisms 201 to 203 may be of a rotation symmetric type as employed in the link mechanism section 3 designed in accordance with a fourth preferred embodiment shown in FIG. 14. The link mechanisms 201 to 203 of the rotation symmetric type are such that the positional relation between an input side group of the input member 204 and the end portion link members 201a to 203a and an output side group of the output member 205 and the end portion link members 201c to 203c is of a positional structure in which the input and output side groups are rotation symmetric with each other about a center line of the intermediate link members 201b to 203b. FIG. 14 shows a condition in which the output member 205 assumes a predetermined working angle relative to the input member 204. It is to be noted that FIG. 14 illustrates the link mechanism section 3 having no gear member 234 provided in the support rods 214a to 216a supported by the input member 204.

Figure 15:
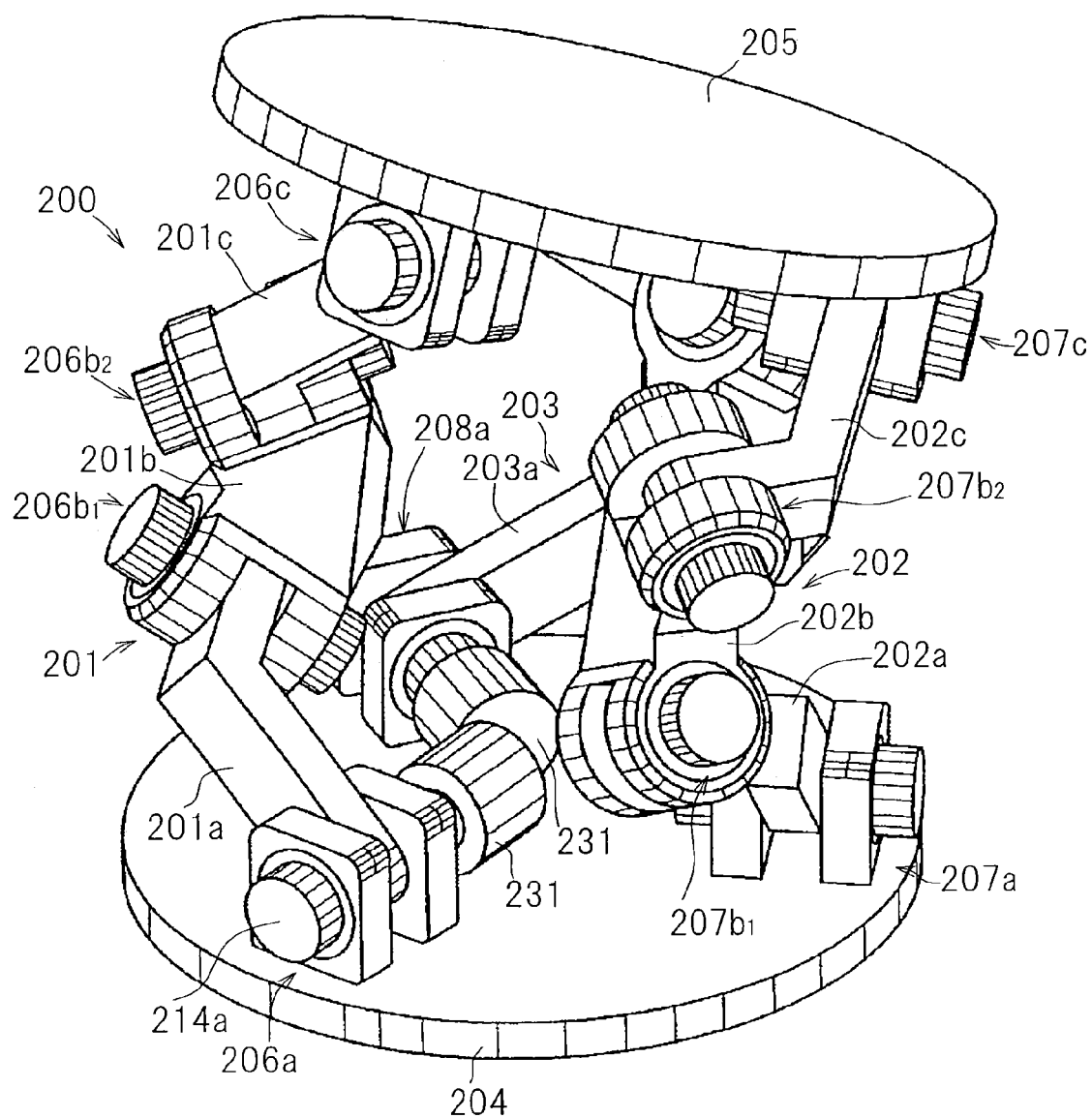
FIG. 15 is a perspective view showing the link actuating device designed according to a fifth preferred embodiment of the present invention.
Figure 16:
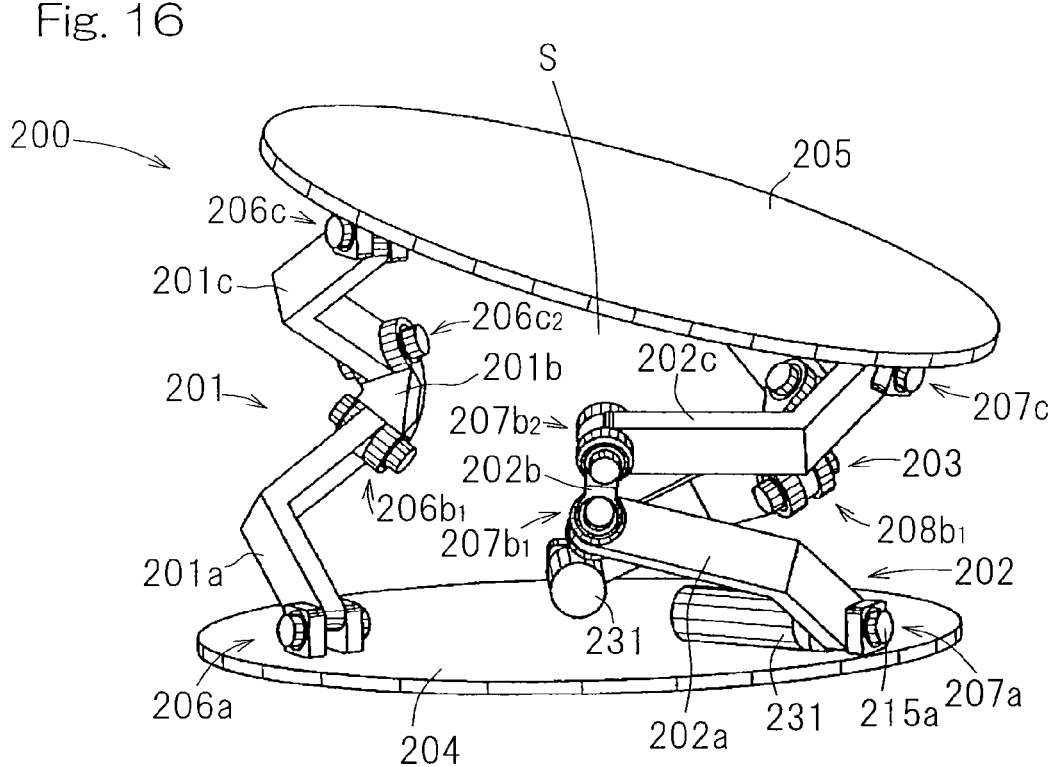
FIG. 16 is a perspective view showing the link actuating device designed according to a sixth preferred embodiment of the present invention.

FIGS. 15 and 16 illustrate a fifth and sixth preferred embodiments of the present invention, respectively, in which the link mechanism section 3 is of a type having the link mechanism drive source 231 installed on the input member 204. In those embodiments, two link mechanisms 231 are installed and respective output shafts of those link mechanism drive sources 231 are coaxially connected with the support rods 214a to 216a that are connected with the arm end portions of the two end portion link members 201a and 203a on the input side. By controlling the rotational angle position of the end portion link members 201a to 203a by means of the link mechanism drive source 231, the attitude of a driven device (not shown) fitted to the output member 205 is controlled.

Those link mechanisms 201 to 203 of the link mechanism section 3 are of a mirror symmetric type, in which the input member 204 and the revolve pairs 206a to 208a on the input side and the output member 205 and the revolve pairs 206c to 208c on the output side are moved in a direction circumferentially (a substantial distance in a widthwise direction), and the rotation axes of the revolve pairs 206b1 to 208b1 and 206b2 and 208b2 of the end link members 201c to 203c on the output side and the intermediate link members 201b to 203b are oriented towards the center axis of the input member 204. For this reason, even though the arm angle (the angle assumed by both axis lines in arm both end portions of the end portion link member) is not 90°, the input side and the output side geometrically represent the same shape. As a result thereof, it is possible to avoid an undesirable interference between the intermediate link members 201b to 203b and the end portion link members 201a to 203a and 201c to 203c. In particular, the sixth preferred embodiment shown in FIG. 16 has such advantages that the inner spaces S of the link mechanisms 201 to 203 are large and accordingly, installation of the link mechanism drive source 231, a rotational angle detector (not shown) and others can be made easily and the range of the center of gravity, within which range the whole device is stabilized, becomes large.

Figure 17:
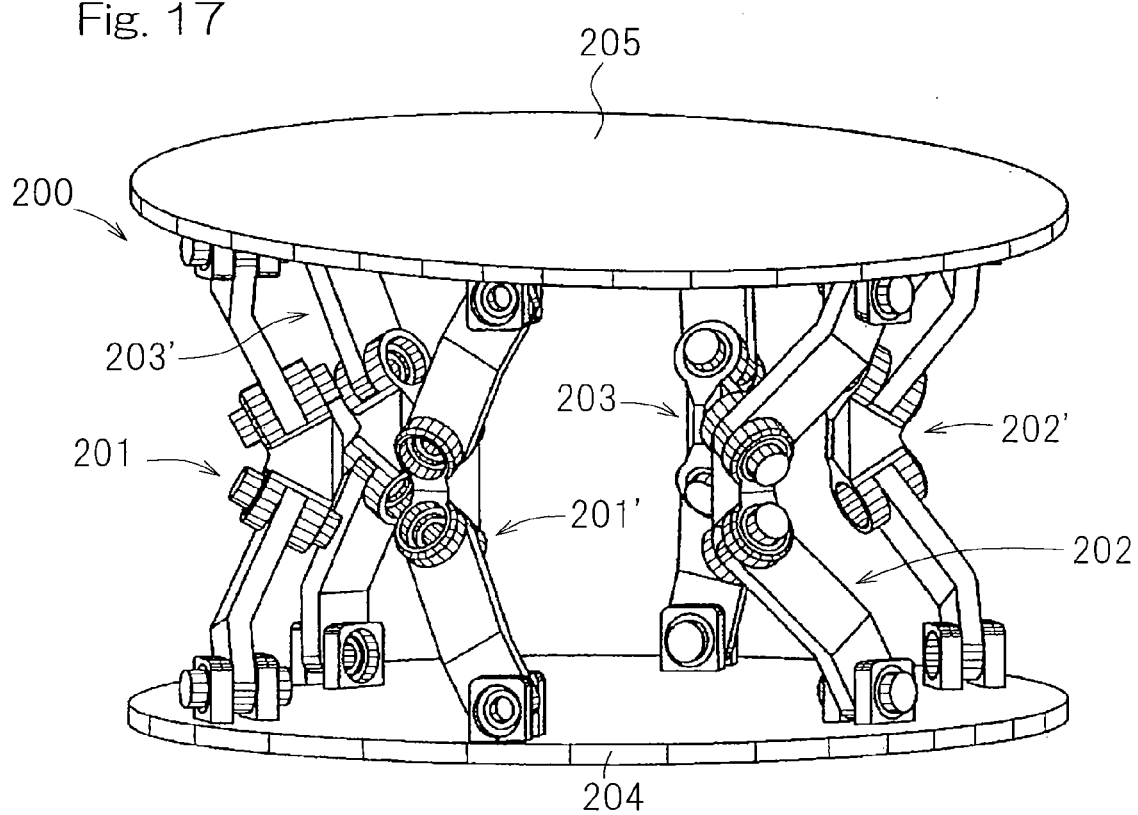
FIG. 17 is a perspective view showing the link actuating device designed according to a seventh preferred embodiment of the present invention.

FIG. 17 illustrates a seventh preferred embodiment of the present invention, in which the link mechanism section 3 is such that the link mechanisms 201, 202, 203, 201', 202' and 203' are employed in six sets so that the range of the center of gravity, within which range the whole device is stabilized, is made large and, also, the rigidity can be increased.

As a different preferred embodiment of the present invention, a rotational angle sensor (not shown) may be provided in the support rods 214a to 216a for supporting the end portion link members 201a to 203a on the input side. By so doing, a servo mechanism may not be needed in the link mechanism drive source 231 and the link mechanism drive source 231 can be compactized and, also, indexing to the point of origin is no longer required at the time an electric power is turned on.

The support rods 214a to 216a referred to previously are supported by respective rotatable bearing rings of the bearings 217a to 219a, and respective stationary bearing rings of those bearings 217a to 219a are fixed to the support members 211a to 213a of the input member 204. The rotational angle sensor is made up of a to-be-detected element provided in an inner end portion of the support rod 214a to 216a and a detector fitted to the input member 204 in face to face relation with the to-be-detected element. It is to be noted that although the to-be-detected element and the detector have been described as installed on a rotatable side and a stationary side, respectively, the detector and the to-be-detected element may be installed on the rotatable side and the stationary side, respectively, because the to-be-detected element merely rotates only an angle of ±45°.

This to-be-detected element is of a radial type and of a ring shape and is made up of an annular backing metal and a magnetic generating member having magnetic poles N and S magnetized alternately to an outer peripheral side of the backing metal. The to-be-detected element is fixed to the support rod 214a to 216a through the backing metal. The magnetic generating member referred to above may suffice to be used in the form in which a rubber magnet, for example, is bonded by vulcanization to the backing metal and, also, this magnetic generating member may be formed by a plastic magnet or a sintered magnet, in which case the backing metal may not be essential.

The detector referred to above is comprised of a magnetic sensor of a rectangular output of a one-side magnetic field operating type or an alternate magnetic field operating type for generating an output signal corresponding to the magnetic flux density. This magnetic sensor is mounted on a magnet detecting circuit substrate (not shown) and is molded with resin after it has been inserted into a resin casing together with the magnetic detecting circuit substrate. With this resin casing fixed to the input member 204, the magnetic sensor and the magnetic detecting circuit substrate are fitted to the input member 204. The magnetic detecting circuit substrate is a substrate on which a circuit for supplying an electric power to the magnetic sensor and outputting the output signal of the magnetic sensor, after the latter has been processed, to the outside. Wiring or the like has to be done by the utilization of the inner space S in the link mechanism 201 to 203.

Accordingly, when the to-be-detected element rotates by rotation of the support rod 214a to 216a, an output signal corresponding to the magnetic flux density of the magnetic generating member is generated from the detector so that the angle of rotation of the support rod 214a to 216a, that is, the angle of rotation of the end portion link member 201a to 203a can be detected. It is to be noted that the magnetic sensor forming the detector itself merely functions as an encoder of an A phase or Z phase output, but the use of a different magnetic sensor other than the magnetic sensor makes it possible to provide an encoder of an AB phase output. Also, in place of the to-be-detected element and the detector, a device capable of detecting the absolute angle of rotation, for example, a method disclosed in the JP Laid-open Patent Publication No. 2003-148999, an optical type detector or a winding type detector such as a resolver can be employed.

Figure 18A:
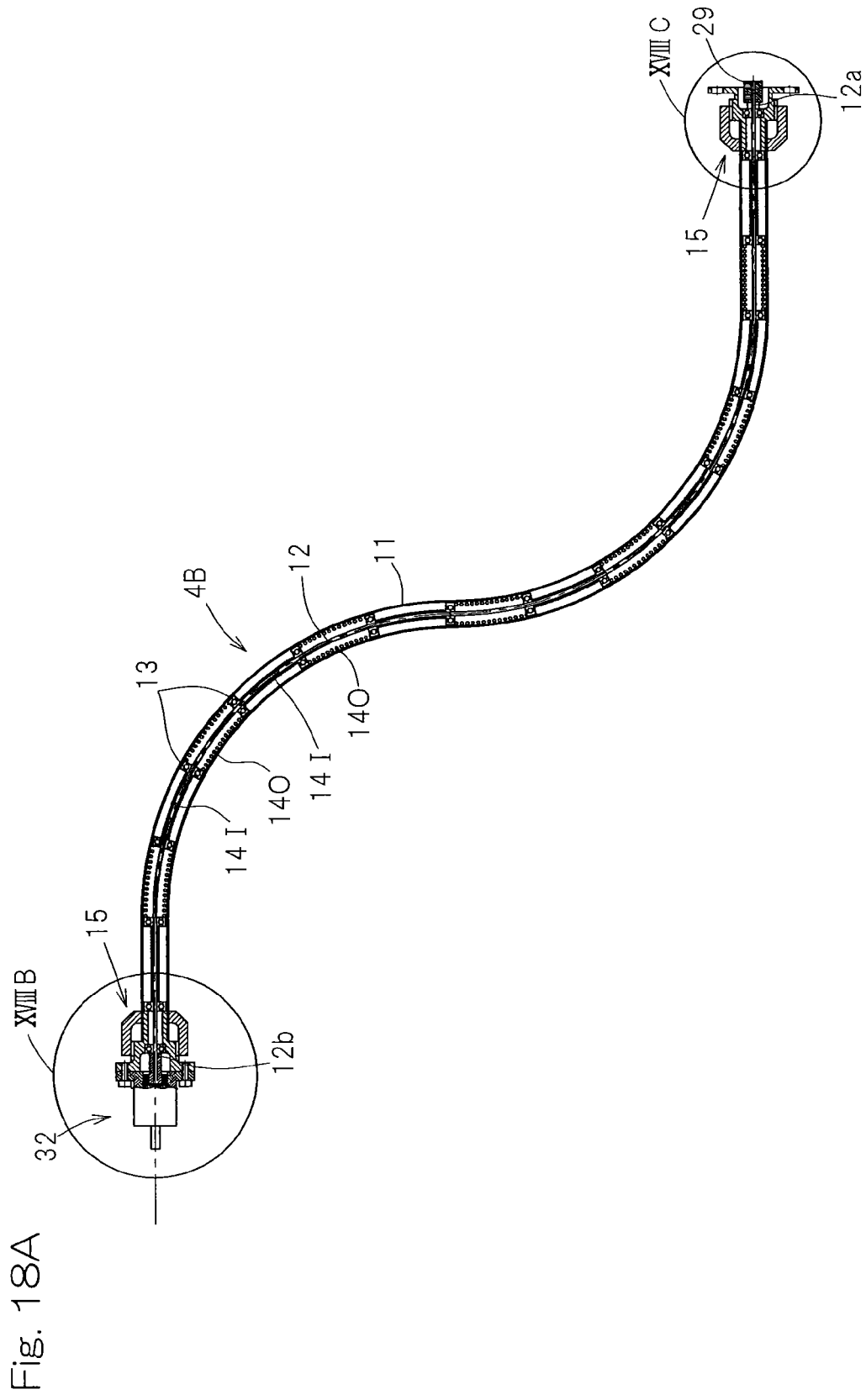
FIG. 18A is a longitudinal sectional view showing a different flexible wire.
Figure 18C:
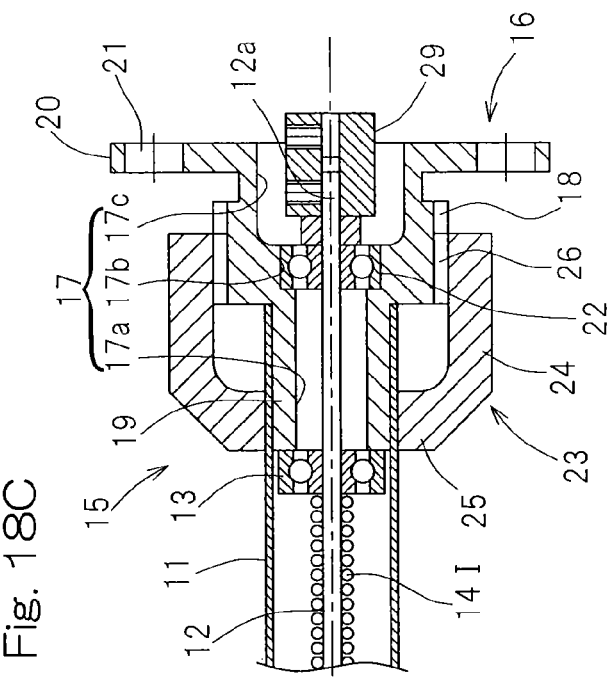
FIG. 18C is a cross sectional view showing, on an enlarged scale, of another portion of the flexible wire encircled by VXIIIC in FIG. 18A.
Figure 18B:
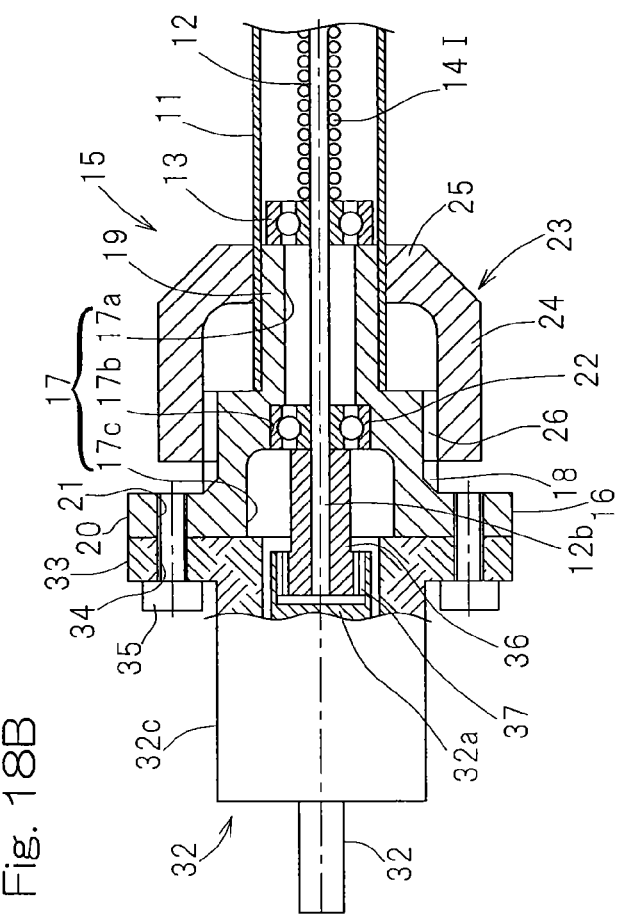
FIG. 18B is a cross sectional view showing, on an enlarged scale, of a portion the flexible wire encircled by XVIIIB in FIG. 18A.

Hereinafter, different structures of the flexible wire will be described in detail. The flexible wire shown in FIGS. 18A to 18C and identified by 4B, is of a type in which the coupling member 15 on the output side and the reduction gear 32 are connected directly with each other. The reduction gear 32 has a flange portion 33 integral with the reduction gear housing 32c, an a plurality of insertion holes 34 defined in the flange portion 33 for the passage of corresponding fixing members therethrough for engagement in the associated holes 21 in the coupling member 15. Each of the insertion holes 21 in the coupling member 15 is in the form of a screw hole. When the flange portion 20 of the coupling member 15 and the flange portion 33 of the reduction gear 32 are held in abutment with each other, bolts 35 inserted through the insertion holes 34 from the side of the reduction gear 32 are threaded into the insertion holes 21, which are also screw holes, so that the coupling member 15 and the reduction gear 32 can be connected together.

Also, the flexible wire 4B referred to above has its output end 12b of the inner wire 12 connected directly with the input shaft 32a of the reduction gear 32. In other words, the output end 12b of the inner wire 12 is provided with a gear 36 in place of the previously described coupling member 19 and this gear 36 is meshed with a gear 37 provided in the input shaft 32a. In the instance as shown, the gear 36 is in the form of an external gear whereas the gear 37 is in the form of an internal gear.

The flexible wire 4B of the structure described above is used with the reduction gear 32 fixed to the external member. No fixing method is limited. According to this construction, since the number of component parts is reduced, the entirety can be compactized. Other than that, the construction is similar to the previously described embodiments. It is to be noted that the reduction gear 32 and the male screw member 16 may be integrated together without allowing the male screw member 16 of the coupling member 15 to be a member separate from the reduction gear 32. More specifically, it is recommended that the reduction gear housing 32c be provided with the male screw portion 18 and the cylindrical portion 19.

FIG. 19 illustrates an example of use of the flexible wire of the embodiment. In this example, by means of the flexile wire 4B shown in and described with particular reference to FIG. 18A, a rotary mechanism 40, in which the final output portion is a rotatable portion, is rendered to be remote controlled. The rotary mechanism 40 is provided in the driven device 81 (best shown in FIG. 8). This rotary mechanism 40 includes a worm 42 having its opposite ends supported by respective bearings 41, a worm wheel 43 meshed with the worm 42, a rotary shaft 44 functioning as the final output portion to support the worm wheel 43, and a rotary encoder 45 which is a position detector for detecting the angle of rotation of the worm wheel 43. The output shaft 32b of the reduction gear 32 in the flexible wire 4B is connected with one end of the work 42 through a coupling member 46. A work equipment such as, for example, a tool or a measuring tool is directly or indirectly fitted to the rotary shaft 44.

The input end 12a of the inner wire 12 is connected with the rotary drive source 6 through a coupling member 29 and, by this rotary drive source 6, the inner wire 12 is rotated. The rotary drive source 6 is controlled by the controller 83 (best shown in FIG. 8). The torque of the inner wire 12 is transmitted to the rotation mechanism 40 after having reduced in speed by the reduction gear 32, and the rotary shaft 44 is consequently rotated. Since the use of the reduction gear 32 makes it possible to generate a large torque, the rotary shaft 44 can be rotated with the high torque. Also, since a force capable of overcoming the friction occurring in the rotation mechanism 40 is generated, stick slip will hardly occur even though the torsional rigidity of the inner wire 12 is low.

Figure 20:
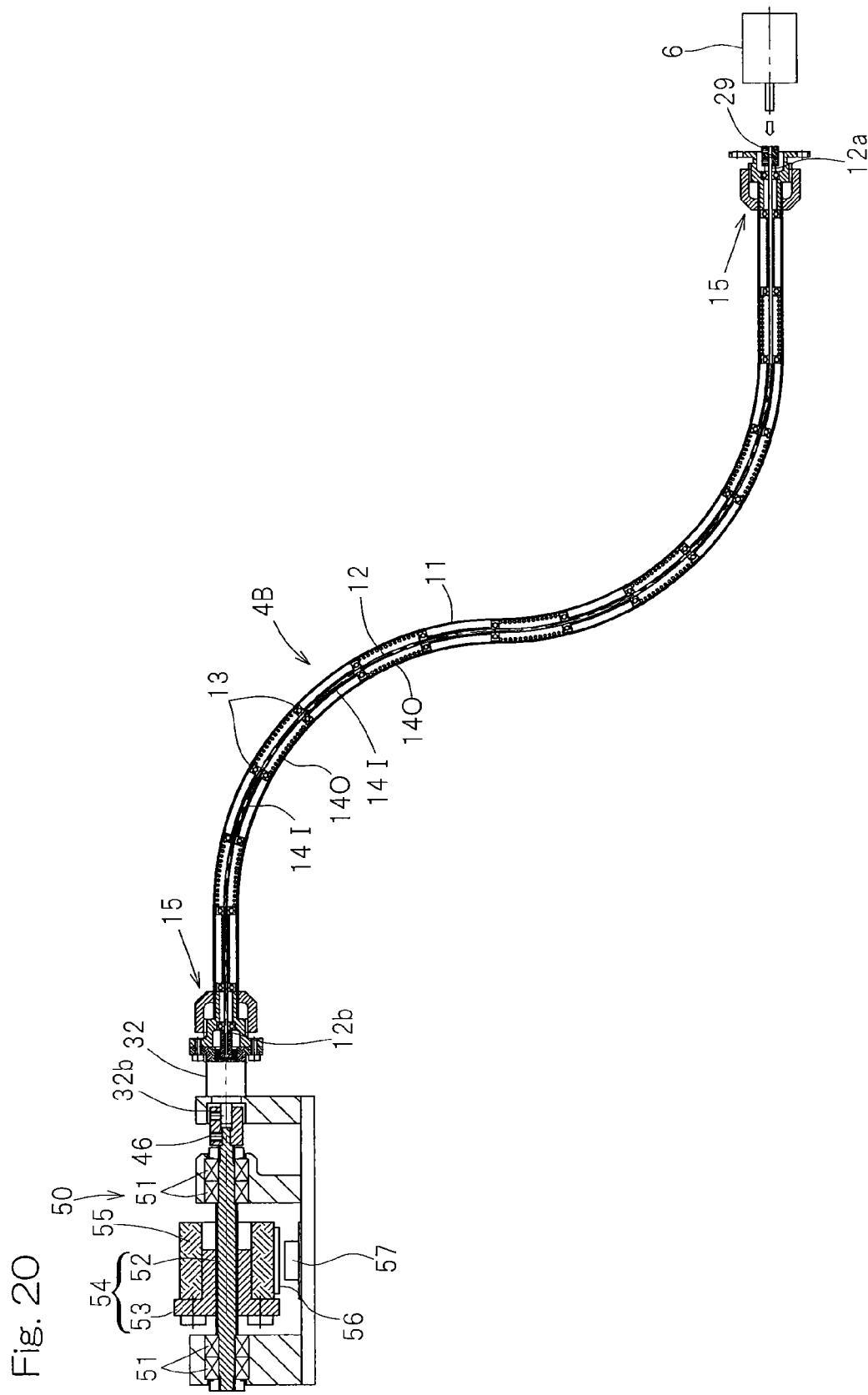
FIG. 20 is a longitudinal sectional view showing the flexible wire, a different drive device connected with one end of the wire, and a rotary drive source connected with the other end of the wire.

A different example of use of the flexible wire is shown in FIG. 20. In this example, by means of the flexible wire 4B shown in FIG. 18A, arrangement is made to control a direct acting mechanism 50, in which the final output portion is a direct acting portion, by remote control. The direct acting mechanism 50 is provided in the driven device 81 (best shown in FIG. 8). The direct acting mechanism 50 includes a ball screw mechanism 54 made up of a ball screw 52, having its opposite ends supported by respective bearings 51, and a nut 53 engageable with the ball screw 52, and a direct acting member 55 functioning as the final output portion is fixed to the nut 53 by means of a bolt (not shown). By this ball screw mechanism 54, a rotational movement of the ball screw 52 is converted into a linear movement and, accordingly, the direct acting member 55 is linearly moved in a direction axially of the ball screw 52. The direct acting member 55 is provided with a linear scale 56, and calibrations on this linear scale 56 are read by a linear encoder 57 which is a position detector. The output shaft 32b of the reduction gear 32 in the flexible wire 4B is connected with one end of the ball screw 52 through the coupling member 46. The direct acting member 55 has a work equipment such as, for example, a tool or a measuring tool fitted directly or indirectly thereto.

The rotary drive source 6 is connected with the input side of the inner wire 12 through the coupling member 29 and, by this rotary drive source 6, the inner wire 12 is rotated. The rotary drive source 6 is controlled by the controller 83 (best shown in FIG. 8). With the torque of the inner wire 12 transmitted to the direct acting mechanism 50 after having been reduced in speed by the reduction gear 32, the direct acting member 55 undergoes a linear movement. Since the use of the reduction gear 32 makes it possible to generate a large torque, a marked thrust force exerted by the direct acting member 55 can be obtained. Also, since a force capable of overcoming the friction occurring in the direct acting mechanism 50 is generated, stick slip will hardly occur even though the torsional rigidity of the inner wire 12 is low.

In performing the remote control of the rotation mechanism 40 or the direct acting mechanism 50, the amount of output of the rotary drive source 6 may be controlled by manually inputting a control command to the control device 83a (best shown in FIG. 8), but if arrangement is made that the amount of output of the rotary drive source 6 is automatically controlled by feeding an output value of the linear encoder 57 or the rotary encoder 45 back to the control device 83a, it is possible to increase the positioning accuracy of the equipments which is an object to be controlled by remote control. Also, since the rotation of the inner wire 12 is reduced in speed by the reduction gear 32 and influences brought about by twisting of the inner wire 12 on the rotation mechanism 40 or the direct acting mechanism 50 is hence minimized, the positioning resolution power of the rotary encoder 45 or the linear encoder 57 can be maintained at a high level, and as a result, a high degree of feedback control can be accomplished. For this reason, the rotation mechanism 40 or the direct acting mechanism 50 can be accurately controlled by remote control.

Figure 21A:
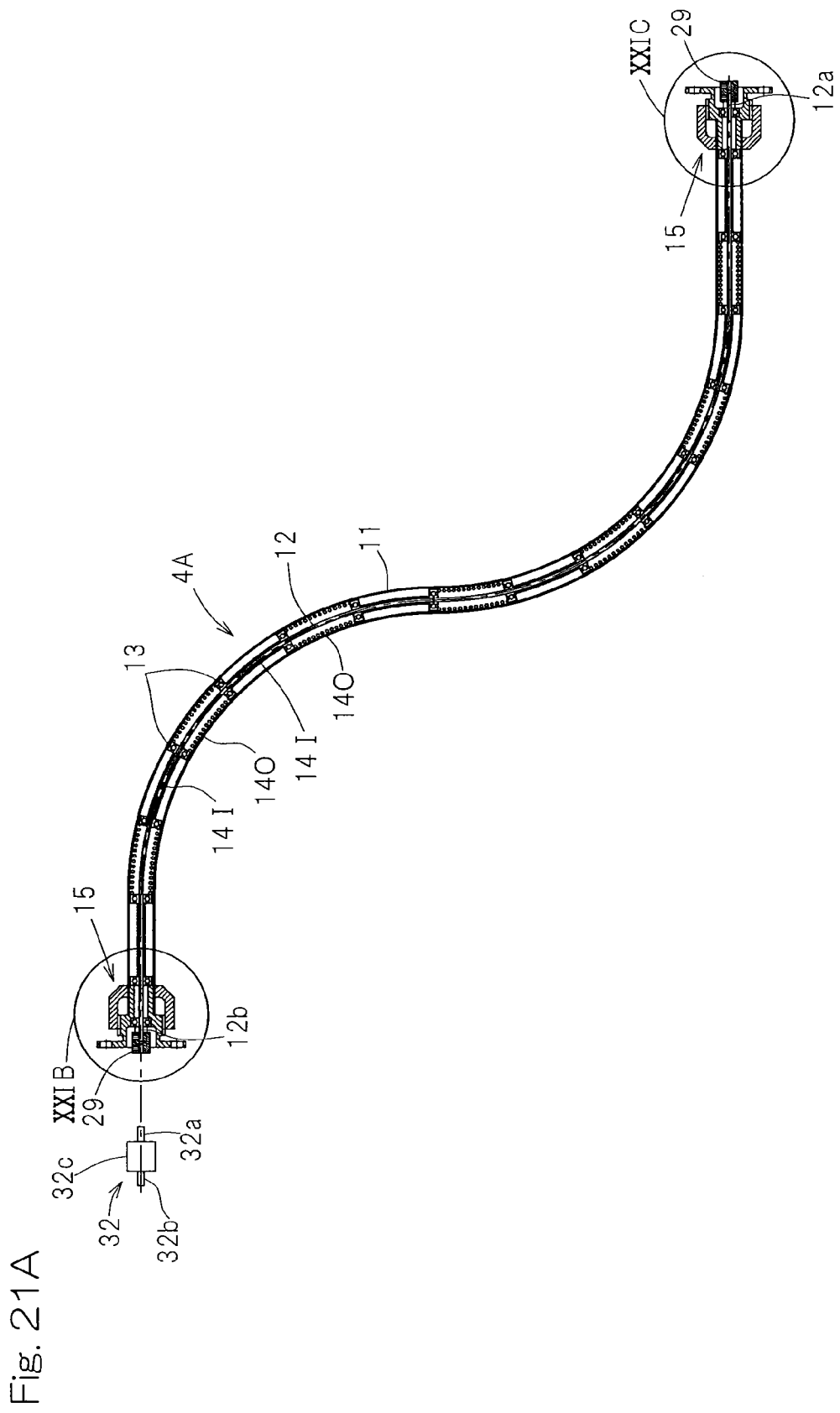
FIG. 21A is a longitudinal sectional view showing a further different flexible wire.
Figure 21B:
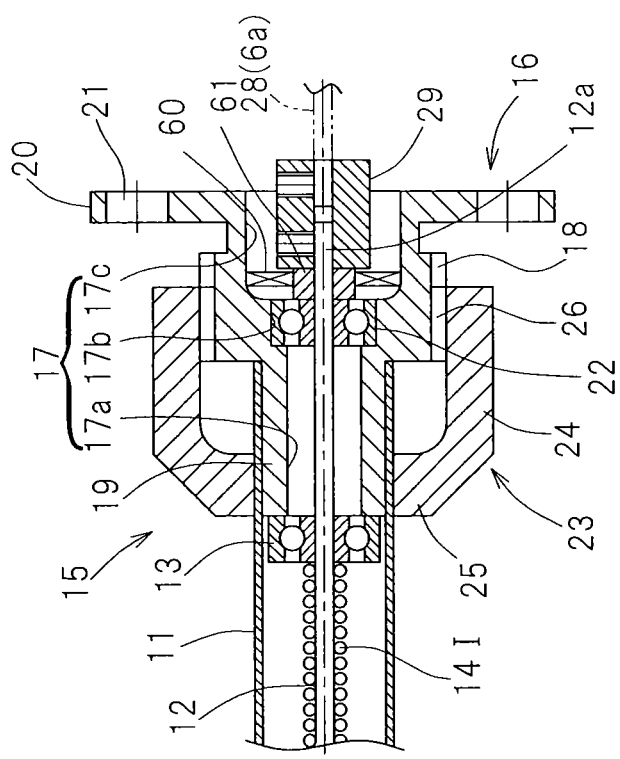
FIG. 21B is a cross sectional view showing, on an enlarged scale, of a portion by XXIB in FIG. 21A.
Figure 21C:
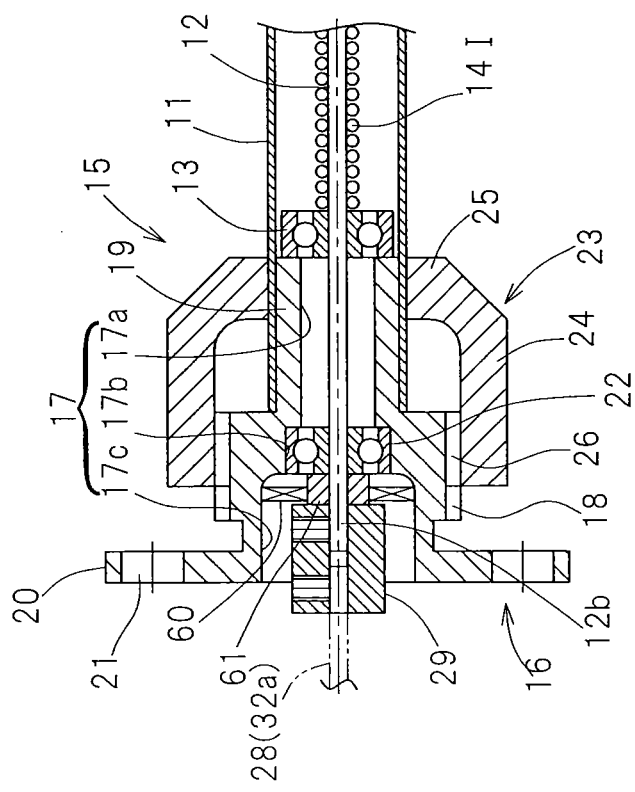
FIG. 21C is a cross sectional view showing, on an enlarged scale, of another portion encircled by XXIC in FIG. 21A.

Although FIGS. 19 and 20 illustrate the respective examples of use of the flexible wire 4B, the rotation mechanism 40 or the direct acting mechanism 50 can be equally accurately controlled by remote control even though the flexible wire 4A as will be described later with reference to FIGS. 21A to 21C is employed. Any of those flexible wires 4A and 4B is suited for use as a rotational force transmitting device for remote controlling the work equipment in the field of, for example, medical and machine processing. By using those flexible wires 4A and 4B, the accurate positioning and the accurate operation of the work equipment can be enabled.

A lubricating agent for the rolling bearings 13 may be filled in the outer tube 11 of any of the flexible wires 4A and 4B. FIGS. 21A to 21C illustrates example of use of the flexible wire 4A. Referring to FIGS. 21A to 21C, sealing members 60 are interposed between the input end 12a and the output end 12b of the inner wire 12 and the coupling member 15 to render the inside of the outer tube 11 to be of a sealed structure and, accordingly, an undesirable leakage of the lubricating agent to the outside can be avoided. In the instance as shown, the sealing member 60 is interposed between a cylindrical member 61, mounted around the outer periphery of each of the input and output ends 12a and 12b of the inner wire 12, and the male screw member 16 of the respective coupling member 15. Instead of the sealing member 60 used, the use may be made of a slide bearing (not shown) between each of the input end 12a and the output end 12b of the inner wire 12 and the coupling member 15 so as to render the inside of the outer tube 11 to be of a sealed structure. For the lubricant agent, the use is preferred of a grease having no fluidity. As described above, if the lubricant agent is filled in the inside of the outer tube 11, the performance of the rolling bearings 13 can be maintained in a favorable condition.

Figure 22:
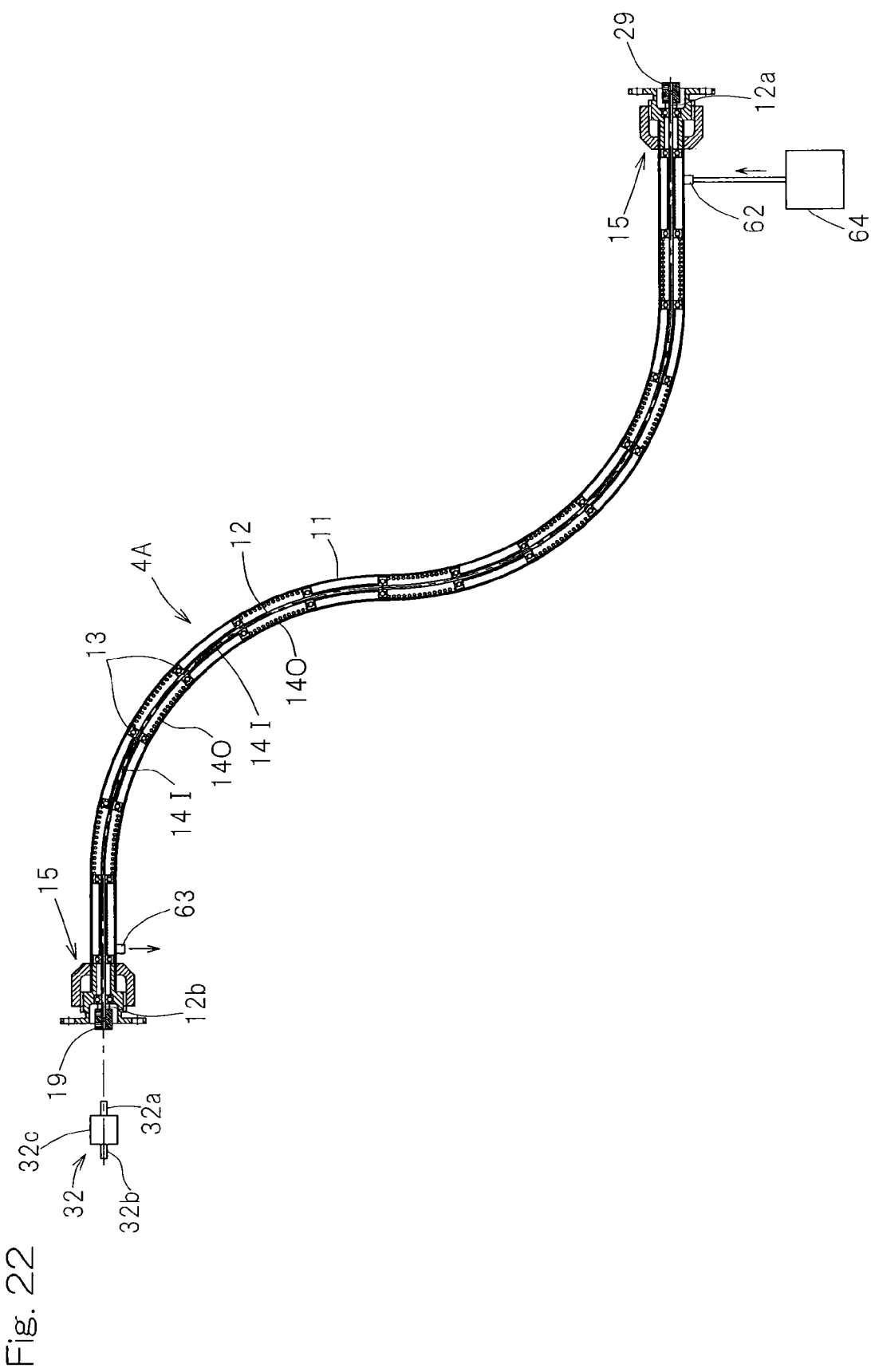
FIG. 22 is a longitudinal sectional view showing a still further different flexible wire.

Also, as shown in FIG. 22, the lubricant agent for the rolling bearings 13 may be allowed to flow within the outer tube 11. In a manner similar to that described above, the use is made of a sealing member (not shown) between the coupling member 15 and each of the input and output ends 12a and 12b of the inner wire 12 so as to render the inside of the outer tube 11 to be of a sealed structure, and also an inlet 62 and an outlet 63 for the lubricant agent are provided at opposite ends of the outer tube 11, respectively. By doing so, the lubricant agent supplied from a lubricant agent supply device 64 flows into the outer tube 11 through the inlet 62 and be discharged to the outside of the outer tube 11 through the outlet 63. The lubricant agent discharged outwardly through the outlet 63 may be recovered to the lubricant agent supply device 64 so that it can be recirculated. For the lubricant, the use is preferred of a lubricant oil having a high fluidity. As described above, with the inside of the outer tube 11 so made as to be a flow passage through the lubricant agent, the rolling bearings 13 can be lubricated with no need to employ any extra lubricating passage. Even in this case, the rolling performance of the rolling bearings 13 can be maintained in a favorable condition.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1A, 1B, 1C: Link actuating device
3: Link mechanism section
4A, 4B: Flexible wire
6: Rotary drive source
11: Outer tube
12: Inner wire
12a: Input end
12b: Output end
13: Rolling bearing
14I: Inner ring spring element
14O: Outer ring spring element
32: Reduction gear
32a: Input shaft
32b: Output shaft
41: Wire guide member
43: Circular trajectory of the intermediate link member
81: Drive device
101, 102, 103: Link mechanism
101a, 102a, 103a: End portion link member on the input side
101b, 102b, 103b: Intermediate link member
101c, 102c, 103c: End portion link member on the output side
104: Input member
105: Output member
106: Throughhole for the flexible wire therethrough
121: Link mechanism drive source
200: Link actuating device
201, 202, 203: Link mechanism
201a, 202a, 203a: End portion link member on the input side
201b, 202b, 203b: Intermediate link member
201c, 202c, 203c: End portion link member on the output side
201', 202', 203': Link mechanism
204: Input member
205: Output member
206a, 207a, 208a: Revolve pair
206b1, 207b1, 208b1: Revolve pair
206b2, 207b2, 208b2: Revolve pair 206c, 207c, 208c: Revolve pair
231: Link mechanism drive source
O: Center of the circular trajectory
L: Distance between the spherical surface centers
PA: Spherical surface center of the end portion link member on the input side
PC: Spherical surface center of the end portion link member on the output side
S: Inner space

What is claimed is:

1. A link actuating device for connecting an output member relative to an input member comprising:
   three or more sets of link mechanisms, the link mechanisms comprising end portion link members on an input side and an output side, respectively, each end portion link member having one end thereof rotatably connected respectively with the input member and the output member, an intermediate link member to which the other ends of the respective end portion link members on the input side and the output side are rotatably connected, a geometrical model, in which each of the link members is expressed by a line, representing a shape that an input side portion and an output side portion of the intermediate link member relative to a center portion of the intermediate link member are symmetrical with each other;
   a link mechanism drive source provided in two or more sets of link mechanisms in the three or more sets of the link mechanisms for actuating each of the link mechanisms of the two or more sets to control a posture of the output member; and
   a flexible wire passed inside an arrangement of the three or more sets of the link mechanisms and having a flexibility and operable to transmit a rotational force in a direction along a direction of arrangement of the input member and the output member,
   wherein the flexible wire is guided by a wire guide member fixed to the intermediate link member and positioned inside each of the link mechanisms.

2. The link actuating device as claimed in claim 1, wherein a throughhole is provided in each of the input member and the output member and the flexible wire is passed through the throughholes in the input and output members.

3. The link actuating mechanism as claimed in claim 1, wherein the wire guide member has a center thereof provided at a position coinciding with a center of the circular trajectory of the intermediate link member.

4. A medical device, in which a drive device adapted to be driven by a rotational force transmitted through the flexible wire is provided in the output member of the link actuating device as defined in claim 1.

5. A remote controlled robot, in which a drive device adapted to be driven by a rotational force transmitted through the flexible wire is provided in the output member of the link actuating device as defined in claim 1.

6. A link actuating device for connecting an output member relative to an input member, comprising:
   three or more sets of link mechanisms, the link mechanisms comprising end portion link members on an input side and an output side, respectively, each end portion link member having one end thereof rotatably connected respectively with the input member and the output member, an intermediate link member to which the other ends of the respective end portion link members on the input side and the output side are rotatably connected, a geometrical model, in which each of the link members is expressed by a line, representing a shape that an input side portion and an output side portion of the intermediate link member relative to a center portion of the intermediate link member are symmetrical with each other;
   a link mechanism drive source provided in two or more sets of link mechanisms in the three or more sets of the link mechanisms for actuating each of the link mechanisms of the two or more sets to control a posture of the output member; and
   a flexible wire passed inside an arrangement of the three or more sets of the link mechanisms and having a flexibility and operable to transmit a rotational force in a direction along a direction of arrangement of the input member and the output member,
   wherein the flexible wire includes a flexible outer tube, a flexible inner wire having its opposite ends defining an input end and an output end for respective rotations and rotatably supported within the outer tube by means of a plurality of rolling bearings, and a spring elements provided between the neighboring rolling bearings for applying a preload to the rolling bearing.

7. The link actuating device as claimed in claim 6, wherein the spring element comprises an inner ring spring element for applying the preload to an inner ring of the rolling bearing and an outer ring spring element for applying the preload to an outer ring, the inner ring spring element and the outer ring spring element being alternately arranged in a direction lengthwise of the inner wire.

8. The link actuating device as claimed in claim 6, further comprising a rotary drive source for rotating the inner wire provided on an input end side of the flexible wire and connected with the input end of the inner wire.

9. The link actuating device as claimed in claim 6, further comprising a reduction gear for reducing the rotation of the inner wire provided on an output end side of the flexible wire and connected with the output end of the inner wire.

* * * * *